(12) United States Patent
Hecht et al.

(10) Patent No.: US 11,397,984 B1
(45) Date of Patent: Jul. 26, 2022

(54) GRAPHICAL USER INTERFACES FACILITATING VEHICLE LEASING

(71) Applicant: RODO INC., New York, NY (US)

(72) Inventors: Noson Hecht, Woodmere, NY (US); Amir Lahav, Ramat Gan (IL)

(73) Assignee: RODO INC., New York, NY (US)

( * ) Notice: Subject to any disclaimer, the term of this patent is extended or adjusted under 35 U.S.C. 154(b) by 242 days.

(21) Appl. No.: 16/900,472

(22) Filed: Jun. 12, 2020

Related U.S. Application Data

(63) Continuation of application No. 16/128,665, filed on Sep. 12, 2018, now Pat. No. 10,685,395.

(60) Provisional application No. 62/557,709, filed on Sep. 12, 2017.

(51) Int. Cl.
| | |
|---|---|
| *G06Q 30/06* | (2012.01) |
| *G06Q 10/08* | (2012.01) |
| *G06Q 40/02* | (2012.01) |
| *G06Q 30/02* | (2012.01) |
| *G06Q 20/32* | (2012.01) |
| *G06F 3/0481* | (2022.01) |

(52) U.S. Cl.
CPC ....... *G06Q 30/0645* (2013.01); *G06F 3/0481* (2013.01); *G06Q 10/087* (2013.01); *G06Q 20/322* (2013.01); *G06Q 30/0283* (2013.01); *G06Q 40/025* (2013.01)

(58) Field of Classification Search
CPC .. B25J 15/0038; B25J 11/0045; B25J 9/1612; B25J 9/1664; B25J 9/16; B25J 11/00; B25J 9/0003; B25J 9/00; B25J 13/089; G06Q 10/00; G06Q 10/06; G06Q 10/087; G06Q 20/322; G06Q 30/02; G06Q 30/06; G06Q 30/0601; G06Q 30/0645; G06Q 40/00; G06Q 40/02; G06Q 40/025; G06Q 40/08; G06Q 40/12; G06Q 50/12; G06V 20/52; G06V 20/00; A47J 44/00; G06K 9/00; G06F 3/0481; H04N 5/23206; G08B 7/068
USPC .... 705/4, 15, 26.1, 26.4, 26.61, 26.62, 26.7, 705/28, 35, 36 R; 340/286.09
See application file for complete search history.

(56) References Cited

U.S. PATENT DOCUMENTS

| | | | |
|---|---|---|---|
| 6,055,513 A | * | 4/2000 | Katz .................. G06Q 20/20 705/27.2 |
| 6,725,201 B2 | | 4/2004 | Joao |
| 6,965,874 B2 | | 11/2005 | Joseph |
| 7,184,978 B1 | | 2/2007 | Tams et al. |
| 7,249,322 B2 | | 7/2007 | Jones et al. |
| 7,689,484 B2 | | 3/2010 | Hall et al. |
| 7,720,731 B1 | | 5/2010 | Ickowicz |
| 7,945,483 B2 | | 5/2011 | Inghelbrecht et al. |
| 8,311,925 B2 | | 11/2012 | Bennett et al. |
| 8,583,513 B1 | | 11/2013 | Talreja et al. |
| 8,626,622 B2 | | 1/2014 | Subramaniam et al. |

(Continued)

*Primary Examiner* — Andrew Joseph Rudy
(74) *Attorney, Agent, or Firm* — Chad D. Tillman; Jeremy C. Doerre; Tillman Wright, PLLC

(57) ABSTRACT

In accordance with one or more preferred implementations, graphical user interfaces (GUIs) for a mobile application or website provide the ability for a user to lease a vehicle online in a streamlined and user-friendly manner. In accordance with one or more preferred implementations, GUIs provide the ability for a user to review available vehicles and vehicle specifications, select a vehicle, request a lease for the selected vehicle, view outstanding action items necessary to finalize the lease and receive delivery of the vehicle, and complete the outstanding action items.

8 Claims, 39 Drawing Sheets

(56) References Cited

U.S. PATENT DOCUMENTS

| | | |
|---|---|---|
| 8,650,093 B2 | 2/2014 | Seergy et al. |
| 8,712,909 B1 | 4/2014 | Raubenheimer et al. |
| 8,799,100 B2 | 8/2014 | Walker et al. |
| 9,037,498 B1 | 5/2015 | Edelman |
| 9,165,319 B1 | 10/2015 | Henry |
| 9,557,889 B2 * | 1/2017 | Raleigh ................ H04M 15/46 |
| 9,712,509 B1 | 7/2017 | Marshall et al. |
| 10,134,003 B1 * | 11/2018 | Loyens ................ G06Q 10/087 |
| 10,140,655 B2 | 11/2018 | Seergy et al. |
| 10,152,744 B2 * | 12/2018 | Fisher .................... G06Q 30/08 |
| 10,152,745 B2 * | 12/2018 | Fisher .................... G06Q 30/08 |
| 10,223,591 B1 | 3/2019 | Goldenberg et al. |
| 10,223,720 B2 | 3/2019 | Seergy et al. |
| 10,223,722 B2 | 3/2019 | Seergy et al. |
| 10,366,435 B2 * | 7/2019 | Swinson ............... G06F 16/951 |
| 10,546,335 B2 | 1/2020 | Nagla |
| 10,580,054 B2 * | 3/2020 | Cain .................. G06Q 30/0623 |
| 10,685,395 B1 | 6/2020 | Hecht |
| 11,010,827 B1 * | 5/2021 | Latronico ............. G06Q 30/08 |
| 11,238,480 B1 * | 2/2022 | Nakhuda ............ G06Q 30/0222 |
| 11,244,339 B2 * | 2/2022 | Lee .................... G06Q 30/0223 |
| 2012/0284153 A1 * | 11/2012 | Hallowell ............ G06Q 10/087 |
| | | 705/28 |

* cited by examiner

GRAPHICAL USER INTERFACES FACILITATING VEHICLE LEASING

CROSS-REFERENCE TO RELATED APPLICATION

This application is a continuation of Ser. No. 16/128,665, filed Sep. 12, 2018, now U.S. Pat. No. 10,685,395, incorporated herein by reference, which '665 application is a nonprovisional application of, and claims priority under 35 U.S.C. § 119(e) to, provisional U.S. patent application 62/557,709, filed Sep. 12, 2017, the disclosure of which is incorporated herein by reference. The drawings of the '709 application are contained in the appendix hereto, incorporated herein by reference.

COPYRIGHT STATEMENT

All of the material in this patent document, including the computer program listing, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith via the USPTO's electronic filing system, and incorporated herein by reference, are computer program files including instructions, routines, and/or other contents of several computer programs. A table setting forth the name and size of files included in the computer program listing is included below.

| File Name   | Creation Date      | File Size (bytes) |
| ----------- | ------------------ | ----------------- |
| ASCIFY.txt  | Sep. 12, 2018 09:05 | 37473             |
| readme.txt  | Sep. 12, 2018 09:21 | 2764              |
| code1.txt   | Sep. 12, 2018 09:37 | 22478505          |
| code2.txt   | Sep. 12, 2018 09:37 | 22478162          |
| code3.txt   | Sep. 12, 2018 09:37 | 22477819          |
| code4.txt   | Sep. 12, 2018 09:09 | 22477476          |
| code5.txt   | Sep. 12, 2018 09:06 | 22477133          |
| code6.txt   | Sep. 12, 2018 09:06 | 22476790          |
| code7.txt   | Sep. 12, 2018 09:05 | 8947041           |

One of these files, "readme.txt", contains instructions for extracting information from the "code" text files, which collectively represent a compressed binary file that has been converted to ascii format. These "code" text files can be converted back to a compressed .zip archive utilizing an assembly conversion program, source code for which is contained in "ASCIFY.txt". The readme file includes instructions for compiling and running this conversion program, and instructions for converting the "code" text files to the compressed, binary file.

The compressed, binary file includes code for aspects and features in accordance with one or more preferred embodiments.

This includes code for an android application comprising, inter alia, Java and C++ code.

This further includes code for an iOS application comprising, inter alia, Objective-C, C, and C++ code.

This further includes code for controller integration comprising, inter alia, Python code.

This further includes code for a statistical analysis module comprising, inter alia, Python code.

This further includes code for a dealer dashboard application comprising, inter alia, JavaScript code.

This code further includes code for feed updating comprising, inter alia, Python code.

This code further includes code for a web app comprising, inter alia, JavaScript code.

This code further includes code for a website comprising, inter alia, JavaScript code.

BACKGROUND OF THE INVENTION

The present invention generally relates to vehicle leasing, and in particular, to car leasing.

Traditionally, leasing a vehicle is a cumbersome and inconvenient process. For example, a potential lessee might spend four hours researching vehicles, only to then still have to visit a car dealer. The potential lessee may then spend three hours visiting a car dealer, choosing a vehicle, and filling out credit and lease forms. The potential lessee may then subsequently have to spend three hours to return to the dealer to complete the transaction and pick up the vehicle. This typical example amounts to a total of ten hours spent over two days.

Some car dealers have attempted to utilize the internet to advertise vehicles available for lease. However, inquiring about these vehicles online typically ends up resulting in an indication to contact the dealer for a quote.

A need exists for improvement in vehicle leasing. This, and other needs, are addressed by one or more aspects of the present invention.

SUMMARY OF THE INVENTION

The present invention includes many aspects and features. Moreover, while many aspects and features relate to, and are described in, the context of car leasing, the present invention is not limited to use only in this context, as will become apparent from the following summaries and detailed descriptions of aspects, features, and one or more embodiments of the present invention.

Accordingly, one aspect of the present invention relates to a computer-implemented method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input search criteria; determining, by the leasing platform based on location information for the user and territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles; displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, via the phone, user input corresponding to selection of a vehicle of the set of vehicles; receiving, via the phone, user input corresponding to an indication to request a lease for the selected vehicle; based on the received user input corresponding to an indication to request a lease for the selected vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; displaying, to the user via the display of the phone, a lease graphical user interface indicating one or more outstanding action items for the requested lease; receiving, from the user via the phone, user input for completion of the outstanding action items for the requested lease; and based on completion of the outstanding action items for the requested lease, effecting delivery of the selected vehicle to the user.

In a feature of this aspect, determining, by the leasing platform based at least in part on the maintained allocated inventory information, a set of vehicles available from the set of one or more dealers that match the input search criteria comprises determining, by the leasing platform based at least in part on the maintained allocated inventory information and the maintained vehicle specification data, a set of vehicles available from the set of one or more dealers that match the input search criteria.

In a feature of this aspect, determining, by the leasing platform based at least in part on the maintained allocated inventory information, a set of vehicles available from the set of one or more dealers that match the input search criteria comprises determining, by the leasing platform based at least in part on the maintained allocated inventory information and the maintained inventory data, a set of vehicles available from the set of one or more dealers that match the input search criteria.

In a feature of this aspect, receiving, from the dealer via the dealer dashboard application, approval of the requested lease occurs prior to displaying, to the user via the display of the phone, a lease graphical user interface indicating one or more outstanding action items for the requested lease.

In a feature of this aspect, receiving, from the user via the phone, user input for completion of the outstanding action items for the requested lease occurs prior to receiving, from the dealer via the dealer dashboard application, approval of the requested lease.

In a feature of this aspect, the phone app is an Android app and the app store is Google Play.

In a feature of this aspect, the phone app is an iOS app and the app store is the Apple App Store.

In a feature of this aspect, the phone is an iOS device.

In a feature of this aspect, the phone is an Android device.

In a feature of this aspect, the input biographical information for the user comprises a name of the user.

In a feature of this aspect, the input biographical information for the user comprises an address for the user.

In a feature of this aspect, the input biographical information for the user comprises an email address for the user.

In a feature of this aspect, the input biographical information for the user comprises a phone number for the user.

In a feature of this aspect, the method further comprises receiving, from the user, information regarding a current or prior vehicle lease of the user.

Another aspect relates to one or more non-transitory computer readable media containing computer executable instructions for performing a method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input search criteria; determining, by the leasing platform based on location information for the user and territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles; displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, via the phone, user input corresponding to selection of a vehicle of the set of vehicles; receiving, via the phone, user input corresponding to an indication to request a lease for the selected vehicle; based on the received user input corresponding to an indication to request a lease for the selected vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; displaying, to the user via the display of the phone, a lease graphical user interface indicating one or more outstanding action items for the requested lease; receiving, from the user via the phone, user input for completion of the outstanding action items for the requested lease; and based on completion of the outstanding action items for the requested lease, effecting delivery of the selected vehicle to the user.

In a feature of this aspect, determining, by the leasing platform based at least in part on the maintained allocated inventory information, a set of vehicles available from the set of one or more dealers that match the input search criteria comprises determining, by the leasing platform based at least in part on the maintained allocated inventory information and the maintained vehicle specification data, a set of vehicles available from the set of one or more dealers that match the input search criteria.

In a feature of this aspect, determining, by the leasing platform based at least in part on the maintained allocated inventory information, a set of vehicles available from the set of one or more dealers that match the input search criteria comprises determining, by the leasing platform based at least in part on the maintained allocated inventory information and the maintained inventory data, a set of vehicles available from the set of one or more dealers that match the input search criteria.

In a feature of this aspect, receiving, from the dealer via the dealer dashboard application, approval of the requested lease occurs prior to displaying, to the user via the display of the phone, a lease graphical user interface indicating one or more outstanding action items for the requested lease.

In a feature of this aspect, receiving, from the user via the phone, user input for completion of the outstanding action items for the requested lease occurs prior to receiving, from the dealer via the dealer dashboard application, approval of the requested lease.

Another aspect relates to a computer-implemented method for vehicle leasing utilizing a plurality of graphical user interfaces (GUIs). The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; receiving, at the leasing platform, allocated inventory information input via the dealer dashboard application; maintaining, at the leasing platform, allocated inventory information based on received allocated inventory information that was input via the dealer dashboard application; providing a leasing platform website; displaying, to a user via a display associated with an electronic device of the user, a registration GUI of the leasing platform website prompting a user to input biographical information; receiving, from the user via the electronic device, input biographical information for the user; automatically performing, by the leasing platform, a soft credit pull for the user to obtain credit information for the user; displaying, to the user via the display associated with the electronic device of the user, a search GUI prompting a user to input search criteria to search for a vehicle to lease; receiving, from the user via the electronic device, input search criteria; determining, by the leasing platform based on location information for the user and territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles; displaying, to the user via the display associated with the electronic device, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, from the user via the electronic device, user input corresponding to selection of a vehicle of the set of vehicles; receiving, from the user via the electronic device, user input corresponding to an indication to request a lease for the selected vehicle; based on the received user input corresponding to an indication to request a lease for the selected vehicle, communicating, from the electronic device to the leasing platform, an indication of the requested lease; displaying, to a dealer via the dealer dashboard application, an indication of the requested lease; receiving, from the dealer via the dealer dashboard application, approval of the requested lease; displaying, to the user via the display associated with the electronic device, a lease graphical user interface indicating one or more outstanding action items for the requested lease; receiving, from the user via the electronic device, user input for completion of the outstanding action items for the requested lease; and based on completion of the outstanding action items for the requested lease, effecting delivery of the selected vehicle to the user.

Another aspect relates to a computer-implemented method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input search criteria; determining, by the leasing platform based on location information for the user and territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles, wherein such determining comprises utilizing a credit score, vehicle manufacturer rebate rates, and user information to create a user credit profile that is used in determining customized lease pricing information; displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, via the phone, user input corresponding to an indication to request a lease for a selected vehicle; based on the received user input corresponding to an indication to request a lease for the selected vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; and based on the requested lease, effecting delivery of the selected vehicle to the user.

In a feature of this aspect, past lease information for a user is utilized in creating a user credit profile that is used in determining customized lease pricing information.

Another aspect relates to a computer-implemented method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; determining, at the leasing platform utilizing statistical analysis based on received inventory data from the one or more inventory management systems, that data for a first vehicle is statistically odd, and based thereon flagging the first vehicle for review via the dealer dashboard application; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input search criteria; determining, by the leasing platform based on location information for the user and territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles; displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, via the phone, user input corresponding to an indication to request a lease for a selected vehicle; based on the received user input corresponding to an indication to request a lease for the selected vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; and based on the requested lease, effecting delivery of the selected vehicle to the user.

In a feature of this aspect, the method further comprises displaying, to a dealer via the dealer dashboard application, an indication that the first vehicle was found to be statistically odd, and receiving, from that dealer via the dealer dashboard application, user input corresponding to an indication to put the first vehicle back in inventory.

In a feature of this aspect, the method further comprises displaying, to a dealer via the dealer dashboard application, an indication that the first vehicle was found to be statistically odd, and receiving, from that dealer via the dealer dashboard application, user input corresponding to an indication to discard the first vehicle.

Another aspect relates to a computer-implemented method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; determining, at the leasing platform utilizing statistical analysis based on received inventory data from the one or more inventory management systems, that data for a first vehicle is statistically odd, and based thereon removing the first vehicle from available inventory; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input search criteria; determining, by the leasing platform based on location information for the user and territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles; displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, via the phone, user input corresponding to an indication to request a lease for a selected vehicle; based on the received user input corresponding to an indication to request a lease for the selected vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; and based on the requested lease, effecting delivery of the selected vehicle to the user.

Another aspect relates to a computer-implemented method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; determining, at the leasing platform utilizing statistical analysis based on received inventory data from the one or more inventory management systems, that data for a first vehicle is statistically odd, and based thereon removing the first vehicle from available inventory and flagging the first vehicle for review via the dealer dashboard application; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input search criteria; determining, by the leasing platform based on location information for the user and territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles; displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, via the phone, user input corresponding to an indication to request a lease for a selected vehicle; based on the received user input corresponding to an indication to request a lease for the selected vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; and based on the requested lease, effecting delivery of the selected vehicle to the user.

In a feature of this aspect, the method further comprises displaying, to a dealer via the dealer dashboard application, an indication that the first vehicle was found to be statistically odd, and receiving, from that dealer via the dealer dashboard application, user input corresponding to an indication to put the first vehicle back in inventory.

In a feature of this aspect, the method further comprises displaying, to a dealer via the dealer dashboard application, an indication that the first vehicle was found to be statistically odd, and receiving, from that dealer via the dealer dashboard application, user input corresponding to an indication to discard the first vehicle.

Another aspect relates to a computer-implemented method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; determining, at the leasing platform, missing vehicle specification details for a vehicle listed in received inventory data; providing, to a plurality of dealers, a dealer dashboard application configured to allow each dealer to allocate inventory to the leasing platform; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input search criteria; determining, by the leasing platform based on location information for the user and territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles; displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, via the phone, user input corresponding to an indication to request a lease for a selected vehicle; based on the received user input corresponding to an indication to request a lease for the selected vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; and based on the requested lease, effecting delivery of the selected vehicle to the user.

In a feature of this aspect, determining, at the leasing platform, missing vehicle specification details for a vehicle listed in received inventory data comprises determining, at the leasing platform, missing vehicle specification details based on package information and code matching.

In a feature of this aspect, determining, at the leasing platform, missing vehicle specification details for a vehicle listed in received inventory data comprises determining, at the leasing platform, missing vehicle specification details utilizing smart string processing and value mapping algorithms that utilize received inventory data to determine missing vehicle specification details.

Another aspect relates to a computer-implemented method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input search criteria; computing, for each dealer of the plurality of dealers utilizing a geo-algorithm, territory information; determining, by the leasing platform based on location information for the user and the computed territory information for the plurality of dealers, a set of one or more dealers available for the user; determining, by the leasing platform based at least in part on the maintained allocated inventory information, a set of vehicles available from the set of one or more dealers that match the input search criteria; determining, by the leasing platform for each vehicle of the set of vehicles, utilizing the credit information for the user, customized lease pricing information for the first user for each vehicle of the set of vehicles; displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user; receiving, via the phone, user input corresponding to an indication to request a lease for a selected vehicle; based on the received user input corresponding to an indication to request a lease for the selected vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; and based on the requested lease, effecting delivery of the selected vehicle to the user.

Another aspect relates to a computer-implemented method for vehicle leasing utilizing a plurality of graphical user interfaces (GUIs) of a phone app. The method includes repeatedly receiving, at a leasing platform, vehicle specification and pricing data from one or more dealer management systems; maintaining, at the leasing platform, vehicle specification and pricing data based on vehicle specification and pricing data received from the one or more dealer management systems; repeatedly receiving, at the leasing platform, inventory data from one or more inventory management systems; maintaining, at the leasing platform, inventory data based on received inventory data from the one or more inventory management systems; providing, to a plurality of dealers, a dealer dashboard application configured to allow each dealer to allocate inventory to the leasing platform; receiving, at the leasing platform, allocated inventory information input via the dealer dashboard application; maintaining, at the leasing platform, allocated inventory information based on received allocated inventory information that was input via the dealer dashboard application; providing, via an app store, the phone app; displaying, to a user via a display of a phone of the user, a registration GUI of the phone app prompting a user to input biographical information; receiving, from the user via the phone, input biographical information for the user; automatically performing, by the leasing platform, a soft credit pull for the user to obtain credit information for the user; displaying, to the user via the display of the phone of the user, a search GUI of the phone app prompting a user to input search criteria to search for a vehicle to lease; receiving, from the user via the phone, input first search criteria; determining, by the leasing platform based on location information for the user and territory information for the plurality of dealers, a first set of one or more dealers available for the user; determining, by the leasing platform based at least in part on the maintained allocated inventory information, a first set of vehicles available from the first set of one or more dealers that match the input first search criteria; determining, by the leasing platform for each vehicle of the first set of vehicles, utilizing the credit information for the user, first customized lease pricing information for the first user for each vehicle of the first set of vehicles; displaying, to the user via the display of the phone of the user, a vehicle browsing GUI including a listing for one or more vehicles of the first set of vehicles, each listing for a respective vehicle including an indication of a customized monthly payment amount for a lease of the respective vehicle that is available to the user, the customized monthly payment amount for the respective vehicle being based on the determined first customized leasing pricing information for the first user; receiving, at the leasing platform, updated dealer configuration settings for a first dealer input via the dealer dashboard application; subsequently, receiving, from the user via the phone, input second search criteria; determining, by the leasing platform based on location information for the user and territory information for the plurality of dealers, a second set of one or more dealers available for the user; determining, by the leasing platform based at least in part on the maintained allocated inventory information, a second set of vehicles available from the second set of one or more dealers that match the input second search criteria; determining, by the leasing platform for each vehicle of the second set of vehicles, utilizing the credit information for the user, second customized lease pricing information for the first user for each vehicle of the second set of vehicles; displaying, to the user via the display of the phone of the user, a vehicle browsing GUI including a listing for one or more vehicles of the second set of vehicles, each listing for a respective vehicle including an indication of a customized monthly payment amount for a lease of the respective vehicle that is available to the user, the customized monthly payment amount for the respective vehicle being based on the determined second customized leasing pricing information for the first user, wherein the determined second customized leasing pricing information for the first user for a first vehicle has been updated as compared to the determined first customized leasing procing information for the first user for the first vehicle as a result of the updated dealer configuration settings for the first dealer input via the dealer dashboard application; receiving, via the phone, user input corresponding to an indication to request a lease for the first vehicle; based on the received user input corresponding to an indication to request a lease for the first vehicle, communicating, from the phone to the leasing platform, an indication of the requested lease; displaying, to a dealer via the dealer dashboard application, an indication of the requested lease; receiving, from the dealer via the dealer dashboard application, approval of the requested lease; and based on the requested lease, effecting delivery of the first vehicle to the user.

Another aspect relates to one or more non-transitory computer readable media containing computer executable instructions for performing a disclosed method.

Another aspect relates to a system for performing a disclosed method.

Another aspect relates to a disclosed method.

Another aspect relates to a disclosed system.

Another aspect relates to one or more non-transitory computer readable media containing computer executable instructions for performing a disclosed method.

Additional aspects and features are found in the appendix attached hereto, which is incorporated herein by reference and forms a part hereof.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

DETAILED DESCRIPTION

Figure 1:
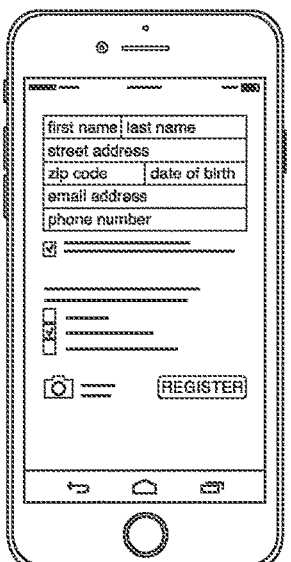
FIGS. 1-2 illustrate an overview of an exemplary process for leasing a car implemented via a smart phone app in accordance with one or more preferred implementations.
Figure 1:
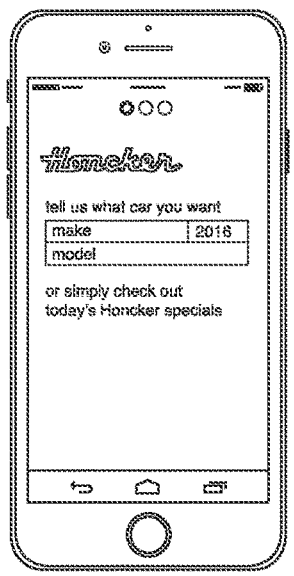
Figure 1:
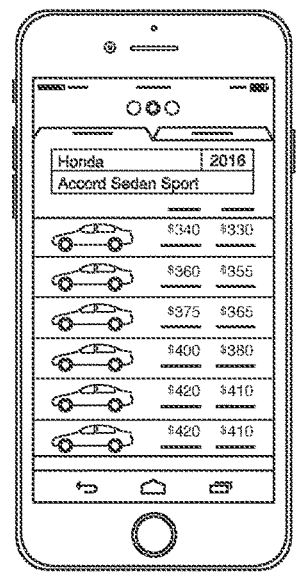
Figure 1:
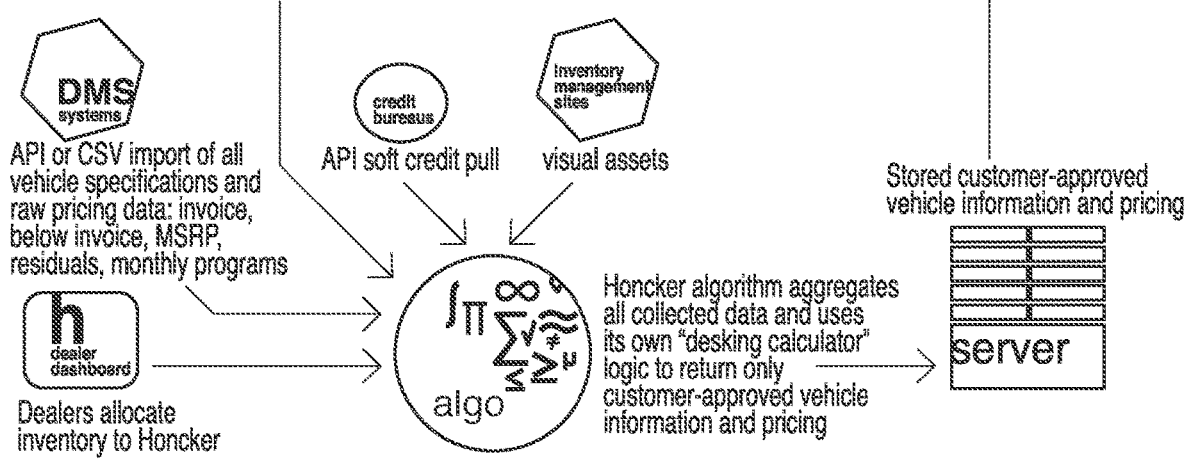

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

As noted above, traditionally, leasing a vehicle is a time consuming process. In accordance with one or more preferred implementations, a website or mobile application provides the ability for potential lessees to lease a vehicle via a quick (e.g. five minute) online transaction.

In accordance with one or more preferred implementations, graphical user interfaces (GUIs) for a mobile application or website provide the ability for a user to lease a vehicle online in a streamlined and user-friendly manner. In accordance with one or more preferred implementations, GUIs provide the ability for a user to review available vehicles and vehicle specifications, select a vehicle, request a lease for the selected vehicle, view outstanding action items necessary to finalize the lease and receive delivery of the vehicle, and complete the outstanding action items.

In accordance with one or more preferred implementations, a vehicle leasing platform provider partners with one or more dealer groups for online transaction and vehicle delivery, provides deep integration into dealer management systems, accesses real-time inventory, demonstrates vehicle feature transparency, provides a drill-down smart business intelligence algorithm, and provides an intuitive user experience.

Figure 2:
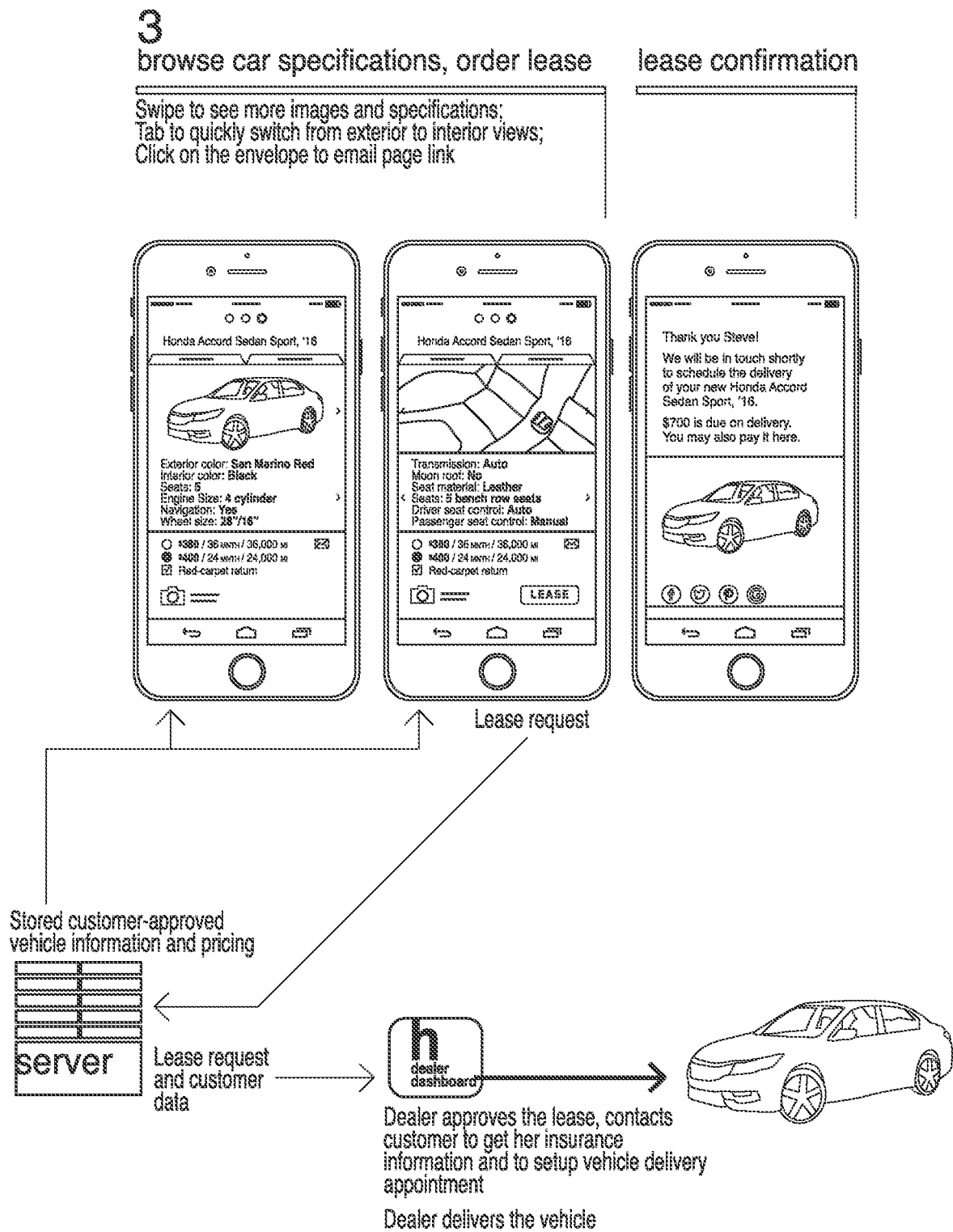

FIGS. 1-2 illustrate an overview of an exemplary process for leasing a car implemented via a phone app in accordance with one or more preferred implementations.

Figure 3:
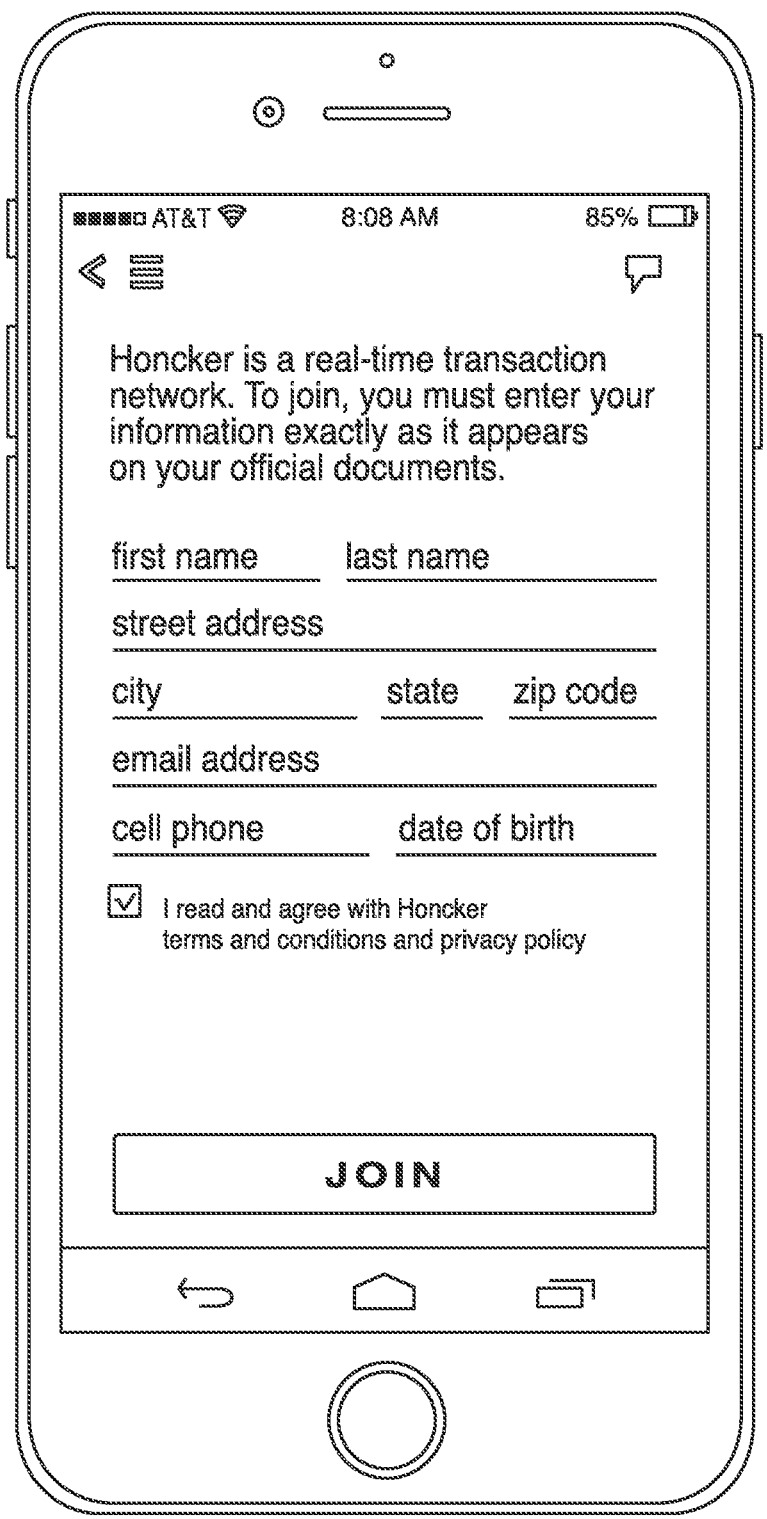
FIGS. 3-5 illustrate exemplary registration graphical user interfaces (GUIs) of a phone app in accordance with one or more preferred implementations.
Figure 4:
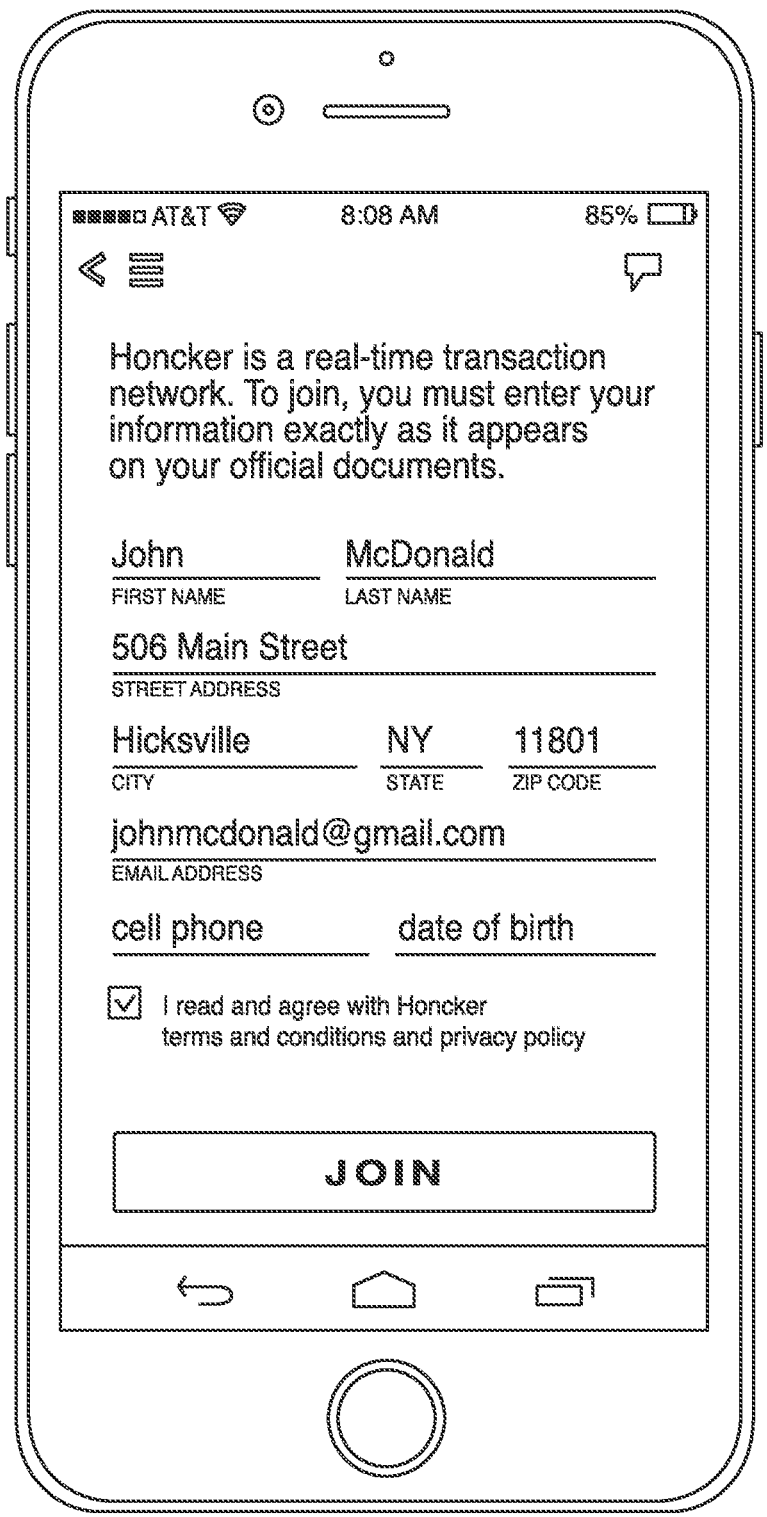
Figure 5:
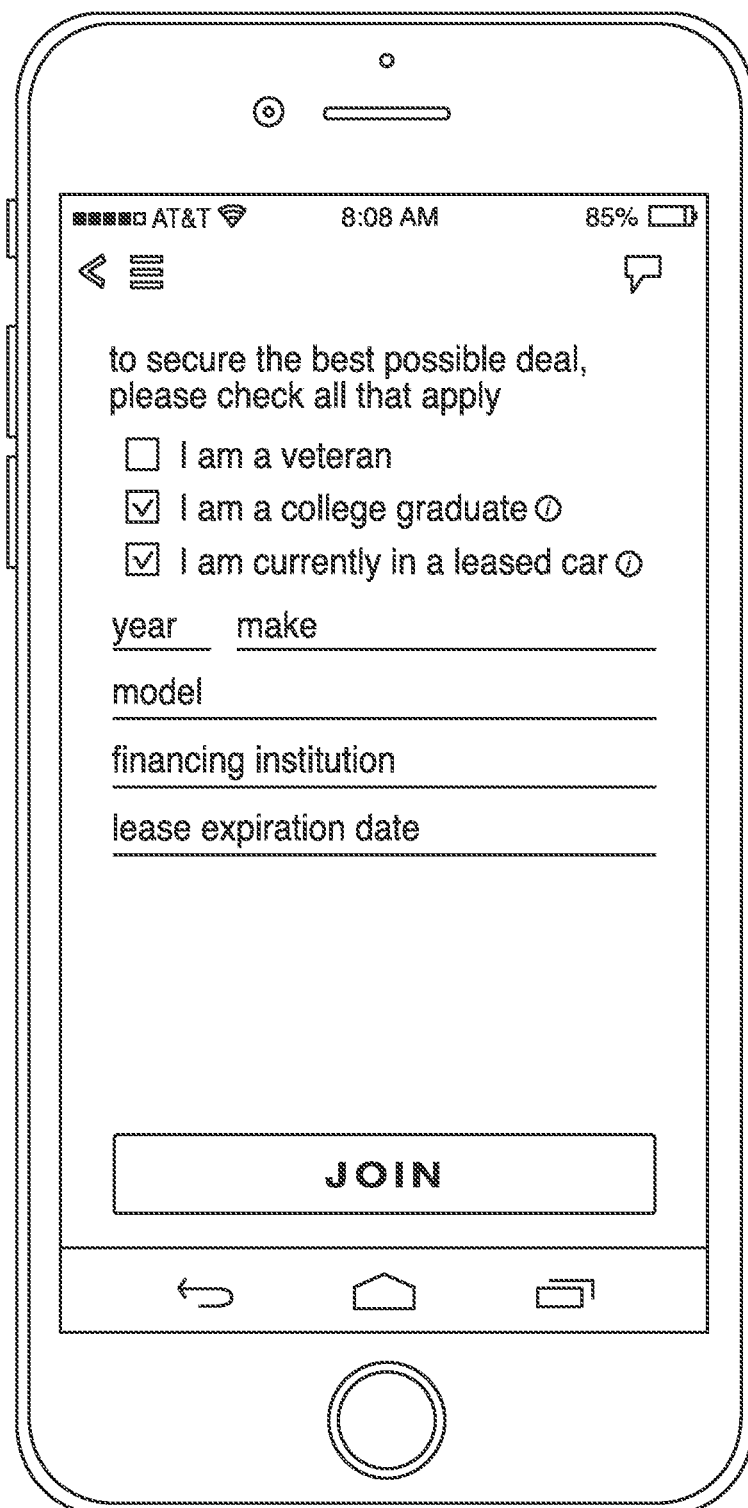
Figure 6:
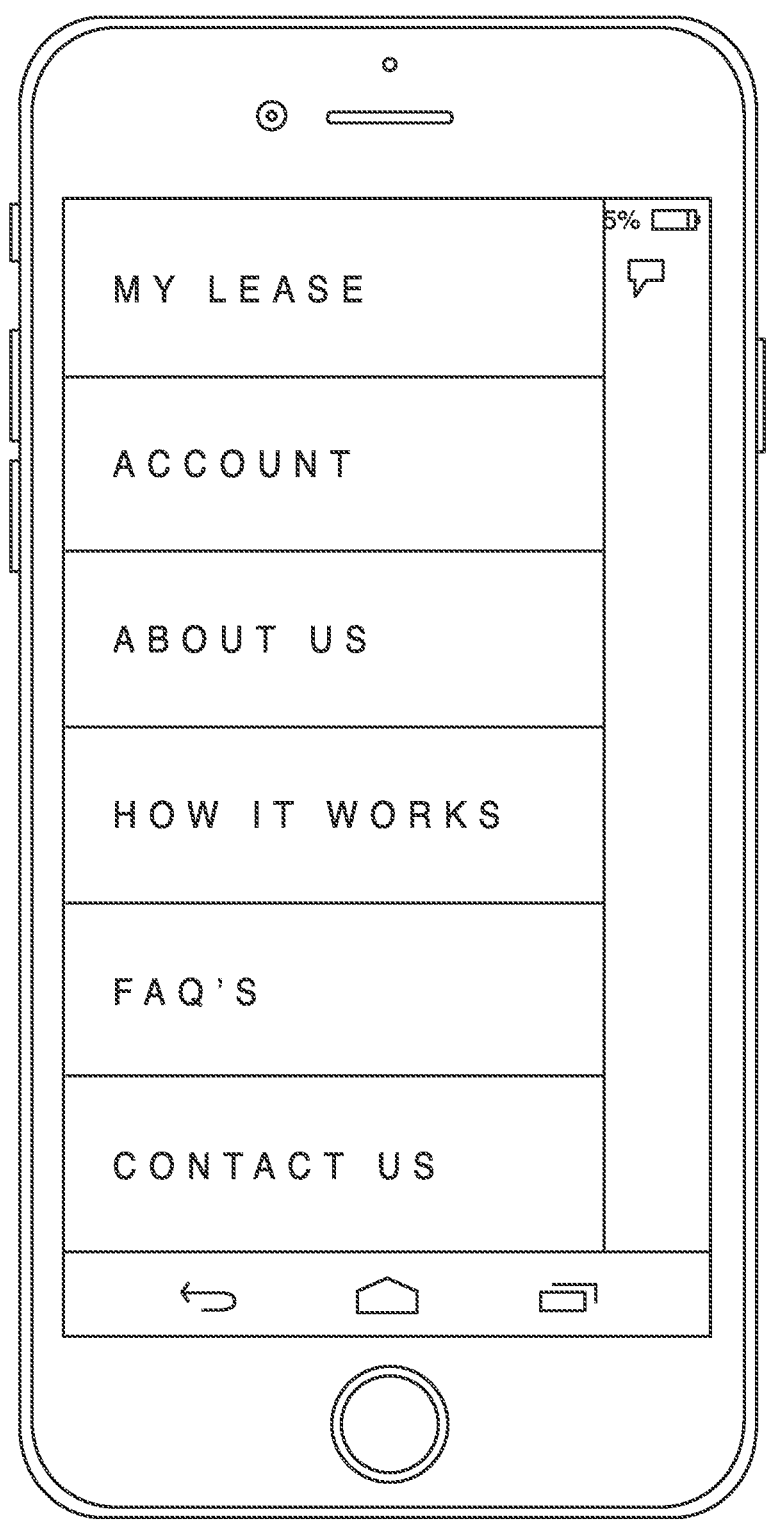
FIGS. 6-9 illustrate exemplary graphical user interfaces of a phone app in accordance with one or more preferred implementations which allow a user to review and edit user account information.
Figure 7:
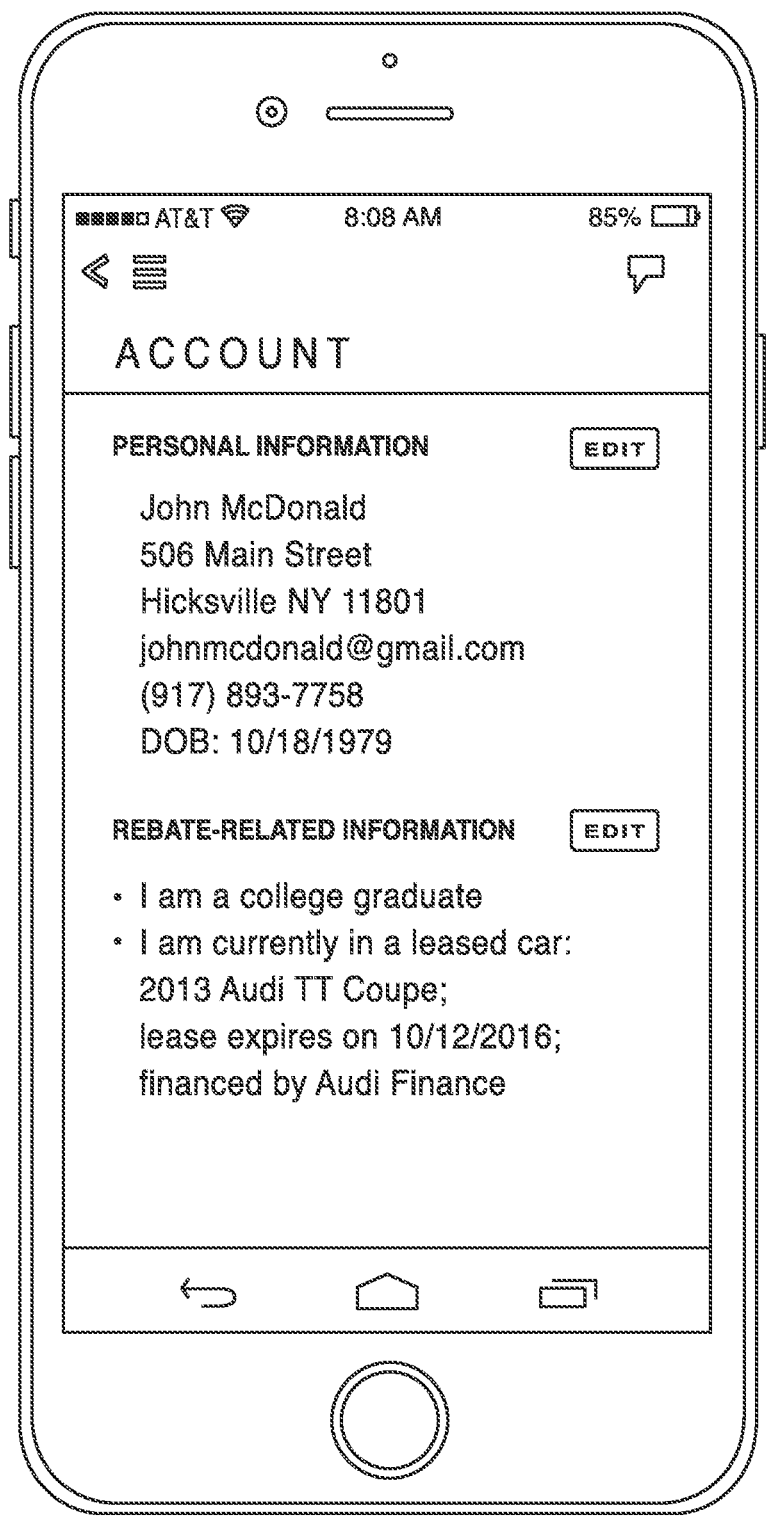
Figure 8:
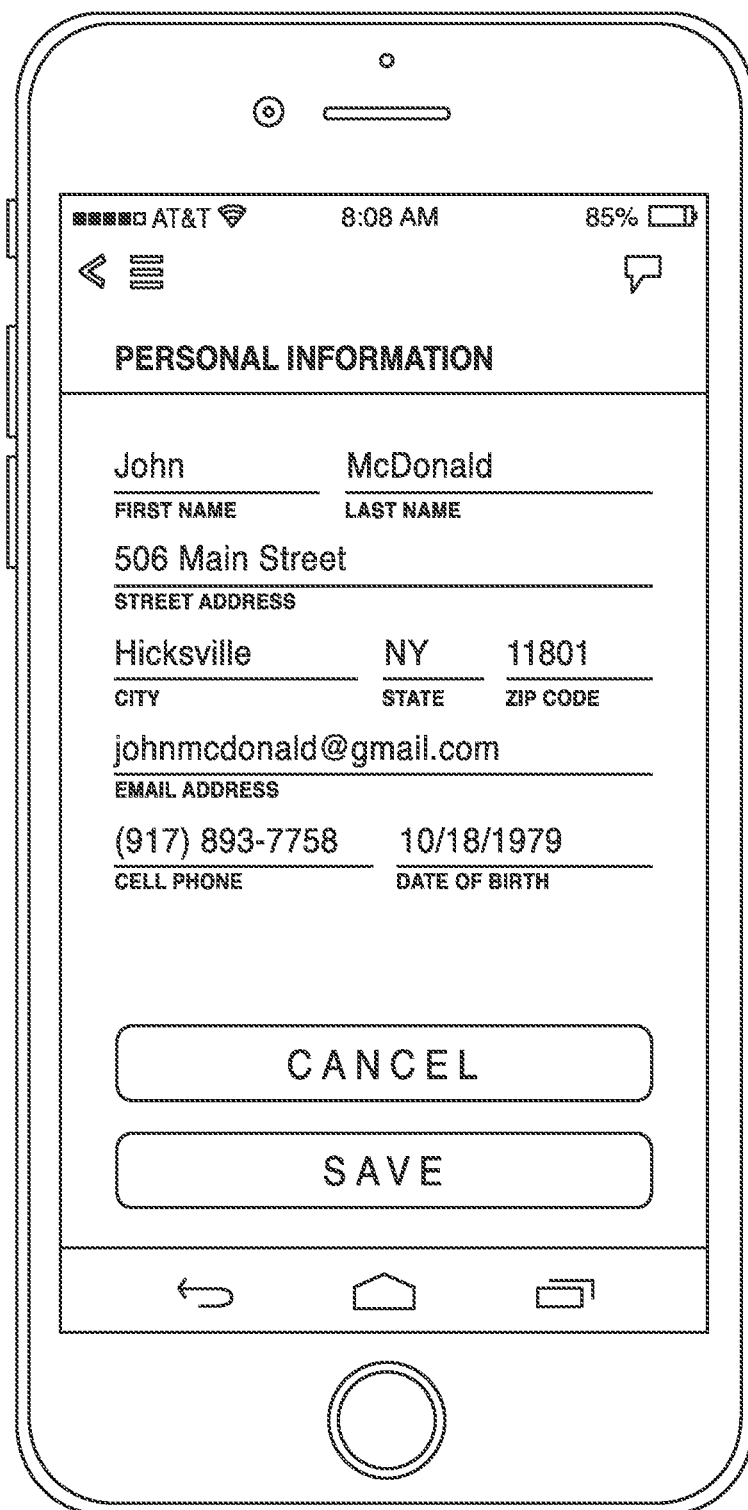
Figure 9:
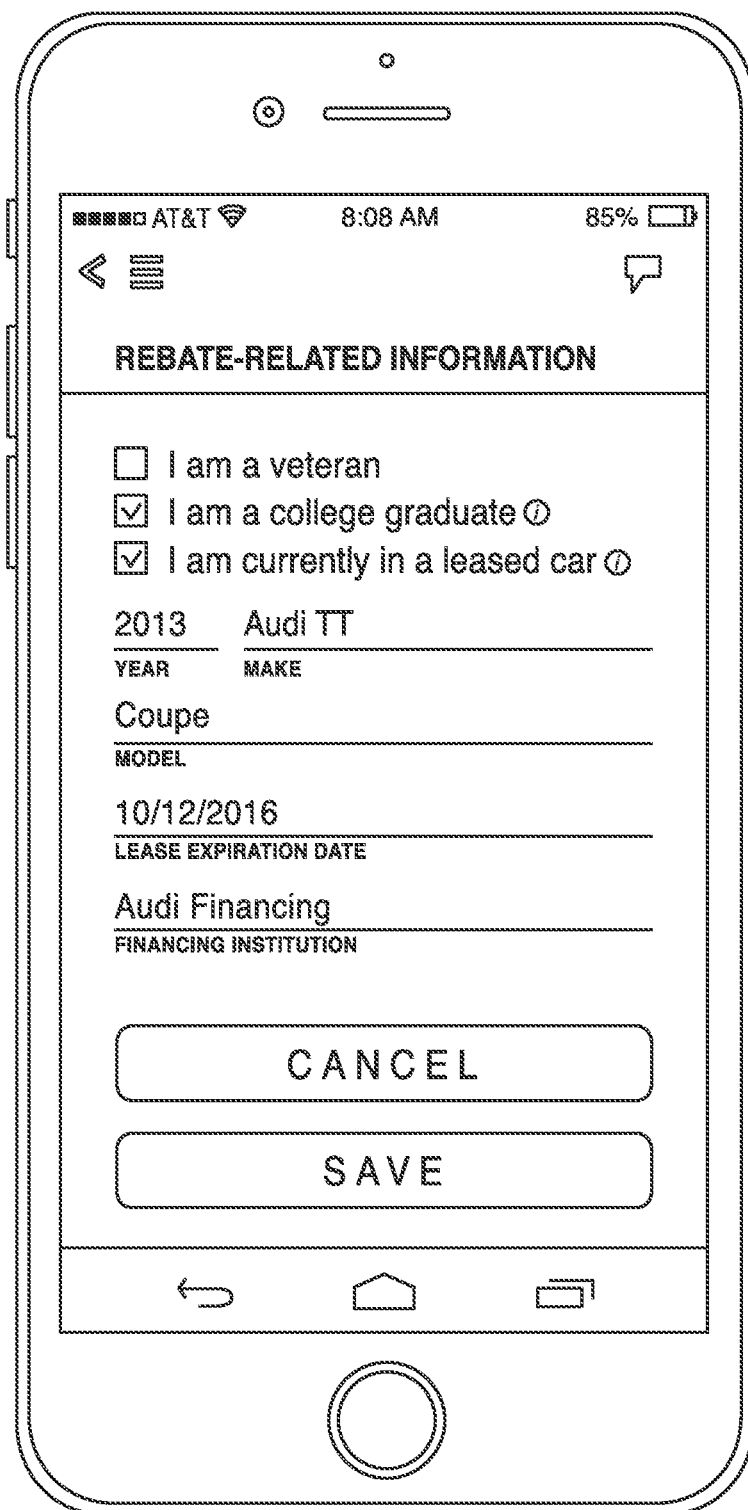

In accordance with one or more preferred implementations, a first-time user registers via one or more registration graphical user interfaces of a phone app. FIGS. 3-5 illustrate exemplary registration graphical user interfaces (GUIs) of a phone app in accordance with one or more preferred implementations.

In accordance with one or more preferred implementations, a graphical user interface of a phone app prompts a user to take or upload a photograph of his or her driver's license.

In accordance with one or more preferred implementations, a user is prompted to input information regarding a current vehicle or lease, which may be utilized to calculate rebate information for the user.

In accordance with one or more preferred implementations, user information provided by a user is utilized to perform a soft credit pull for the user, which is utilized to generate lease pricing information for the user.

In accordance with one or more preferred implementations, once a user has registered, he or she is able to subsequently access, review, and edit user account information for his or her account. FIGS. 6-9 illustrate exemplary graphical user interfaces of a phone app in accordance with one or more preferred implementations which allow a user to review and edit user account information.

In accordance with one or more preferred implementations, once a user has registered, the user can utilize one or more search graphical user interfaces to search for vehicles available for lease. In accordance with one or more preferred implementations, a user can input search criteria for a make, model, and/or year of a vehicle, as illustrated in FIG. 1.

Figure 10:
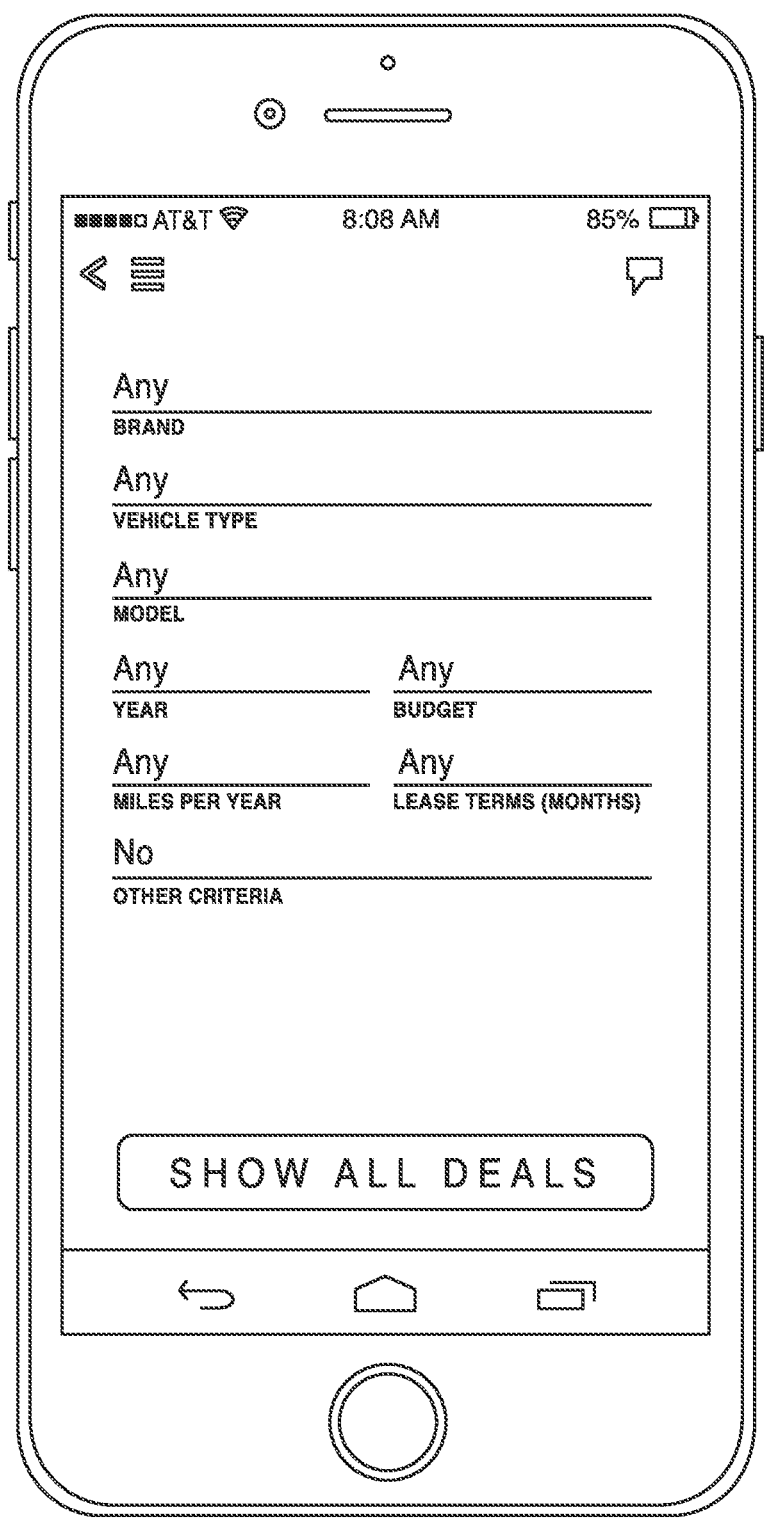
FIGS. 10-12 illustrate exemplary graphical user interfaces of a phone app in accordance with one or more preferred implementations configured to allow a user to input search criteria to search for a vehicle.
Figure 11:
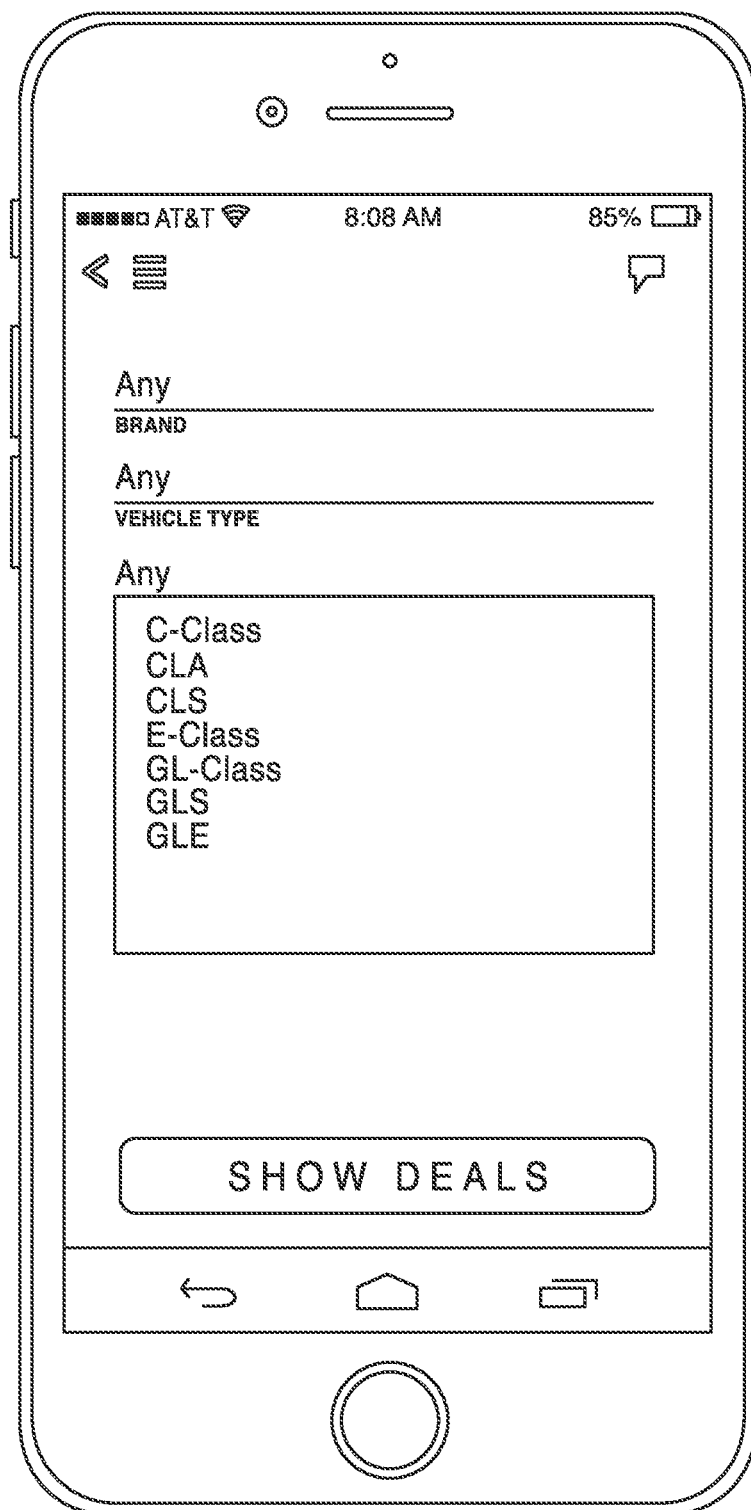
Figure 12:
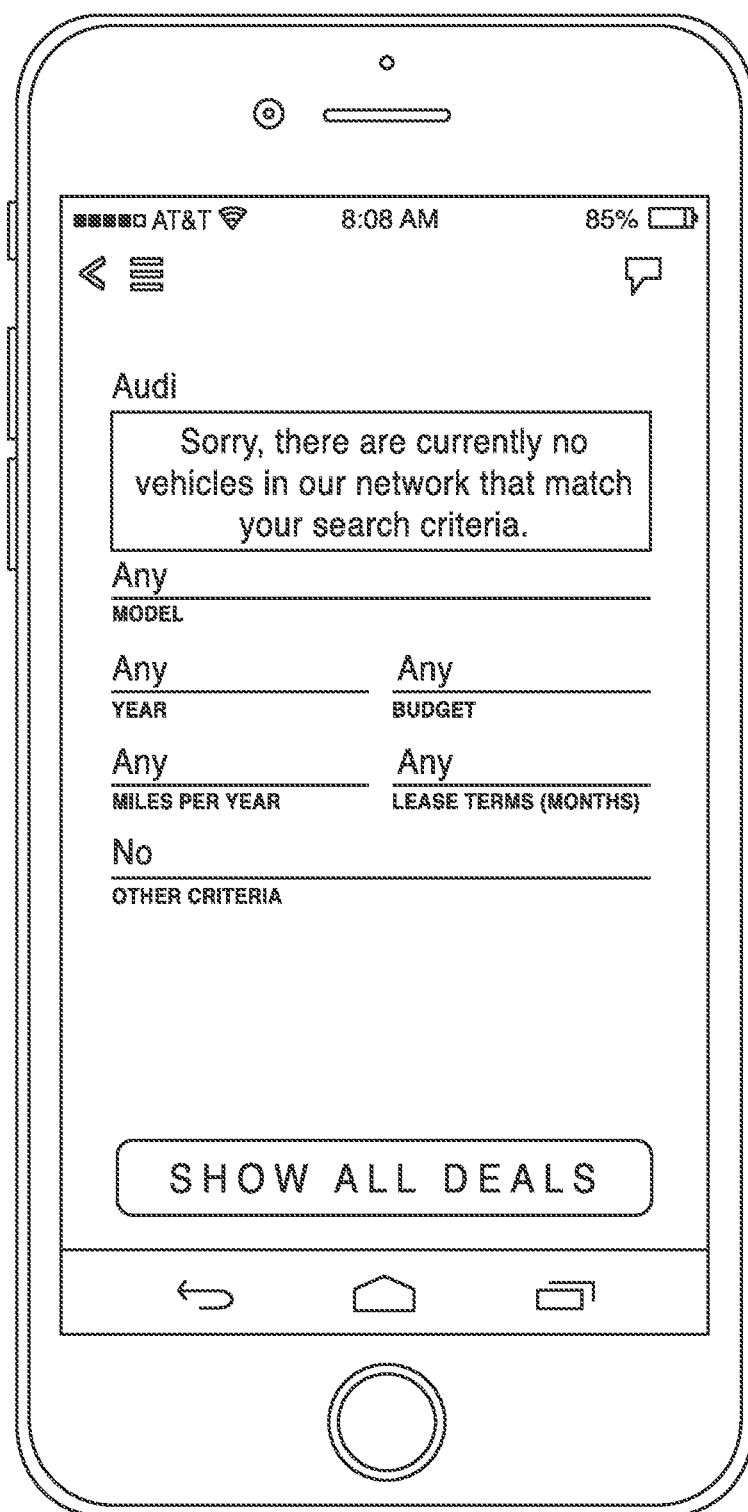

FIGS. 10-12 illustrate exemplary graphical user interfaces of a phone app in accordance with one or more preferred implementations configured to allow a user to input search criteria to search for a vehicle. In accordance with one or more preferred implementations, a user can input search criteria and/or search based on brand, vehicle type, model, year, budget, miles per year, lease term (e.g. length in months), or other criteria. In accordance with one or more preferred implementations, a user can interact with a graphical user interface to access a drop down list or similar list allowing a user to select available entries for a particular search criteria, as illustrated in FIG. 11.

In accordance with one or more preferred implementations, searching is performed based on user input search criteria, as well as other search criteria based on user information. For example, geographic filtering may be utilized to only show vehicles offered by dealers in the same state, geographic area, or within a certain radius, distance, or estimated travel time.

In accordance with one or more preferred implementations, a leasing platform receives from one or more dealer management (DMS) systems (e.g. each associated with a dealership or dealer) vehicle specifications and raw pricing data (e.g. via automated or manual application programming interface (API) or comma-separated value (CSV) file importing). In accordance with one or more preferred implementations, this information may include invoice price information, below invoice price information, manufacturer suggested retail price (MSRP) information, residuals information, and monthly program information.

Figure 13:
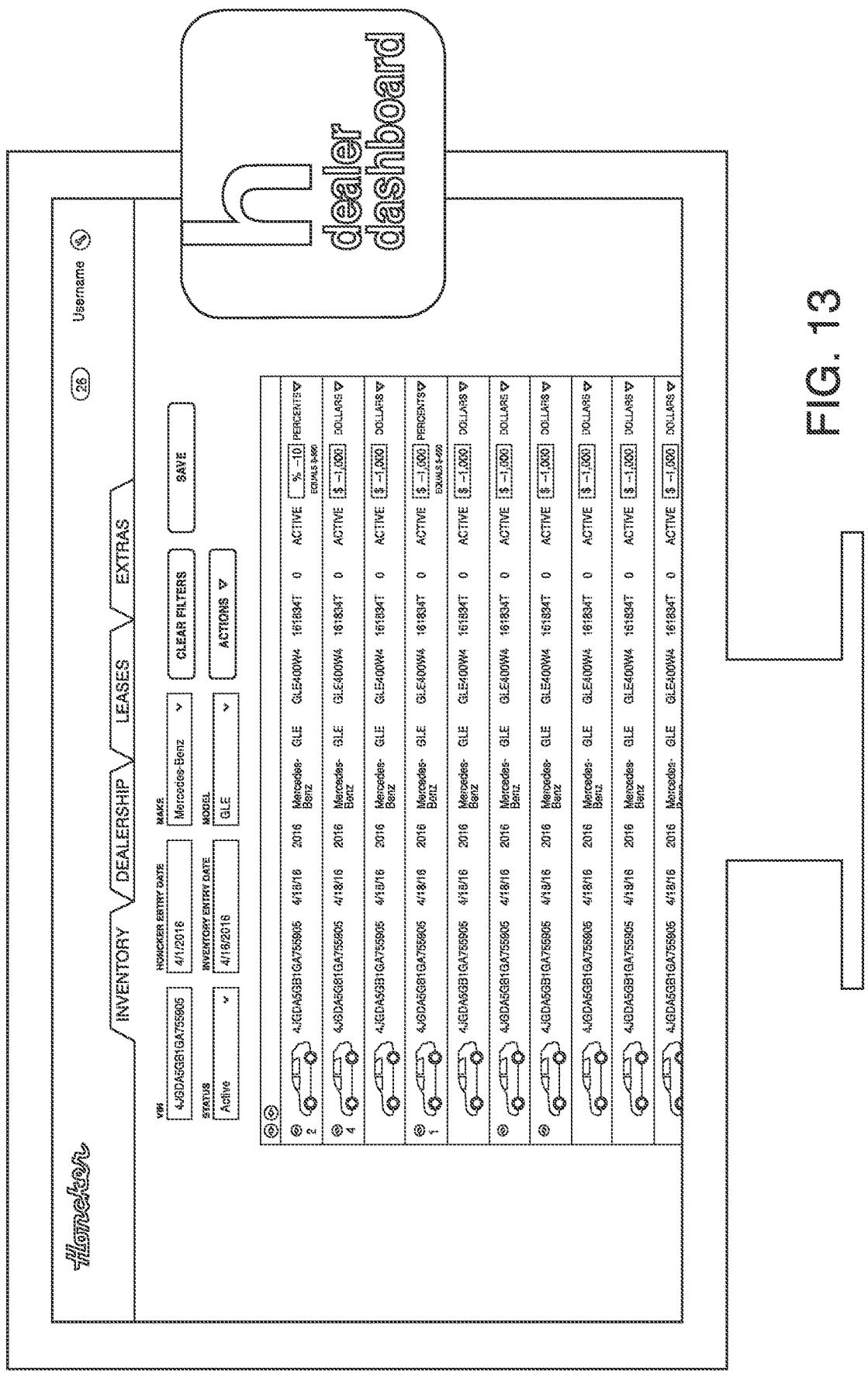
FIG. 13 illustrates an exemplary dealer dashboard in accordance with one or more preferred implementations.

In accordance with one or more preferred implementations, a dealer is able to allocate inventory to the leasing platform via a dealer dashboard. FIG. 13 illustrates an exemplary dealer dashboard in accordance with one or more preferred implementations.

In accordance with one or more preferred implementations, a leasing platform is configured to utilize vehicle information and pricing information acquired from DMS systems, dealer information and input provided by a dealer via a dealer dashboard, and visual asset information from inventory management systems. In accordance with one or more preferred implementations, this information is used in one or more algorithms together with credit information for a user from a soft credit pull. In accordance with one or more preferred implementations, a desking calculator methodology is utilized to return only customer-approved vehicle information and pricing.

In accordance with one or more preferred implementations, inventory anomalies are identified and eliminated utilizing statistical algorithms. In accordance with one or more preferred implementations, inter-dealership statistics are utilized to eliminate human error in inventory feeds. In accordance with one or more preferred implementations, a car that is statistically found odd will be called or flagged for review. In accordance with one or more preferred implementations, flagged vehicles are automatically removed from inventory. In accordance with one or more preferred implementations, dealers are able to review flagged vehicles via a dealer dashboard and put the flagged vehicle back in inventory, or throw out the flagged vehicle.

In accordance with one or more preferred implementations, complete specification details for a vehicle are able to be determined based on package information and code matching. In accordance with one or more preferred implementations, smart string processing and value mapping algorithms are utilized that help look through an inventory feed's specifications and build a full specification profile for a vehicle.

In accordance with one or more preferred implementations, the leasing platform utilizes inventor information, vehicle specification and pricing information, and user credit information to determine vehicles available for lease for a user (e.g. at all, or within a specified price range), and further determines (e.g. calculates) for each available vehicle lease pricing information customized for the user based on the user credit information.

In accordance with one or more preferred implementations, rather than simply utilizing a credit score, an optimal credit tier for a user is calculated based on credit score, vehicle manufacturer rebates, and personal information for the user (e.g. collected user data regarding past leases). In accordance with one or more preferred implementations, this creates a more realistic credit profile to be used for price calculations.

Figure 14:
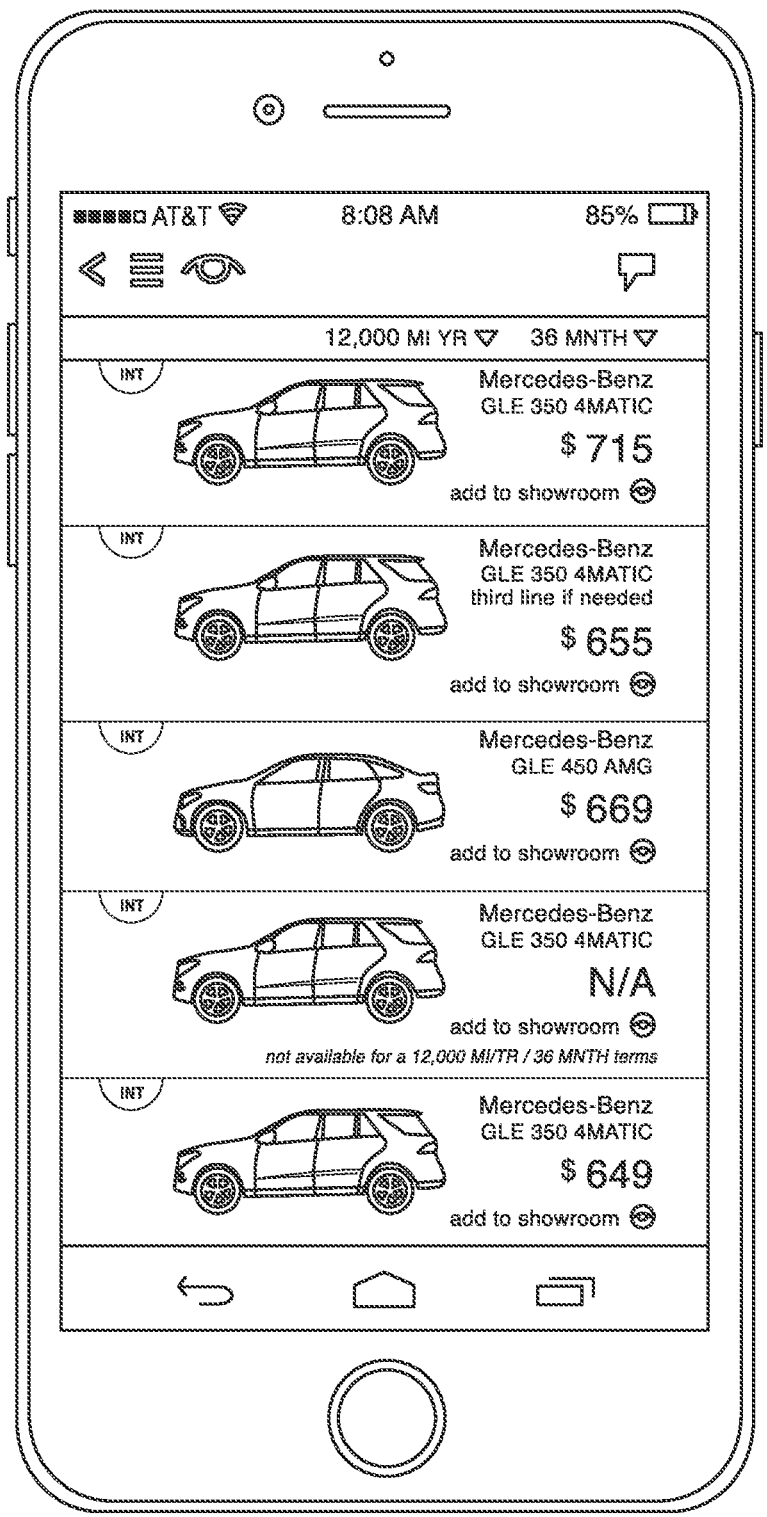
FIG. 14 illustrates an exemplary vehicle browsing graphical user interface in accordance with one or more preferred implementations.

In accordance with one or more preferred implementations, customized vehicle lease information and pricing (approved for that user) is stored at a server of the leasing platform (e.g. stored in association with the particular user), and provided to a user via a vehicle browsing graphical user interface of a phone app. FIG. 14 illustrates an exemplary such vehicle browsing graphical user interface in accordance with one or more preferred implementations.

In accordance with one or more preferred implementations, a leasing platform operates to "desk" as a user searches, allowing a user to search for and through a list of cars, while actually desking each deal and showing an absolute final price.

In accordance with one or more preferred implementations, the vehicles to be offered or displayed to a user are determined based on dealer territory, credit constraints, customer location, and personal information for the user. In accordance with one or more preferred implementations, a geo-algorithm uses location data to computer a territory for a plurality of dealers or dealerships (and/or uses territory information provided via a dealer dashboard) and offers cars from each dealer or dealership only to customers located within the corresponding territory.

In accordance with one or more preferred implementations, a leasing platform is configured for real-time pricing and territory adjustments. In accordance with one or more preferred implementations, a dealer can set lender information, territory information, profit information, and fee information using a dedicated dashboard, and see the changes sent to the leasing platform in real time.

In accordance with one or more preferred implementations, a vehicle browsing graphical user interface displays listings for a plurality of vehicles, each listing including a picture for the vehicle and a custom user lease price for the vehicle. Preferably, the custom user lease price for the user has been calculated by the leasing platform based on pricing information and user credit information for the user.

In accordance with one or more preferred implementations, each listing includes a user interface element indicating one or more interior colors for the vehicle corresponding to the listing. In accordance with one or more preferred implementations, each listing also includes a user interface element indicating one or more exterior colors for the vehicle corresponding to the listing. This is particularly useful if a stock photograph has to be used for a vehicle that is not the same color as the vehicle corresponding to the listing.

In accordance with one or more preferred implementations, a leasing platform is configured to allow a user to indicate that he or she desires to add a vehicle to a virtual showroom for that user. For example, the vehicle browsing graphical user interface of FIG. 14 includes, adjacent each listing for a vehicle that has not already been added to a user's showroom, a showroom user interface element configured to allow the user to add the vehicle to the user's showroom. In accordance with one or more preferred implementations, graphical user interfaces for a leasing platform generally include a showroom user interface element which allows a user to easily and quickly access his or her showroom from other graphical user interfaces of the leasing platform, as illustrated in FIG. 14, where a showroom user interface element is displayed proximate a top left of the screen.

Figure 15:
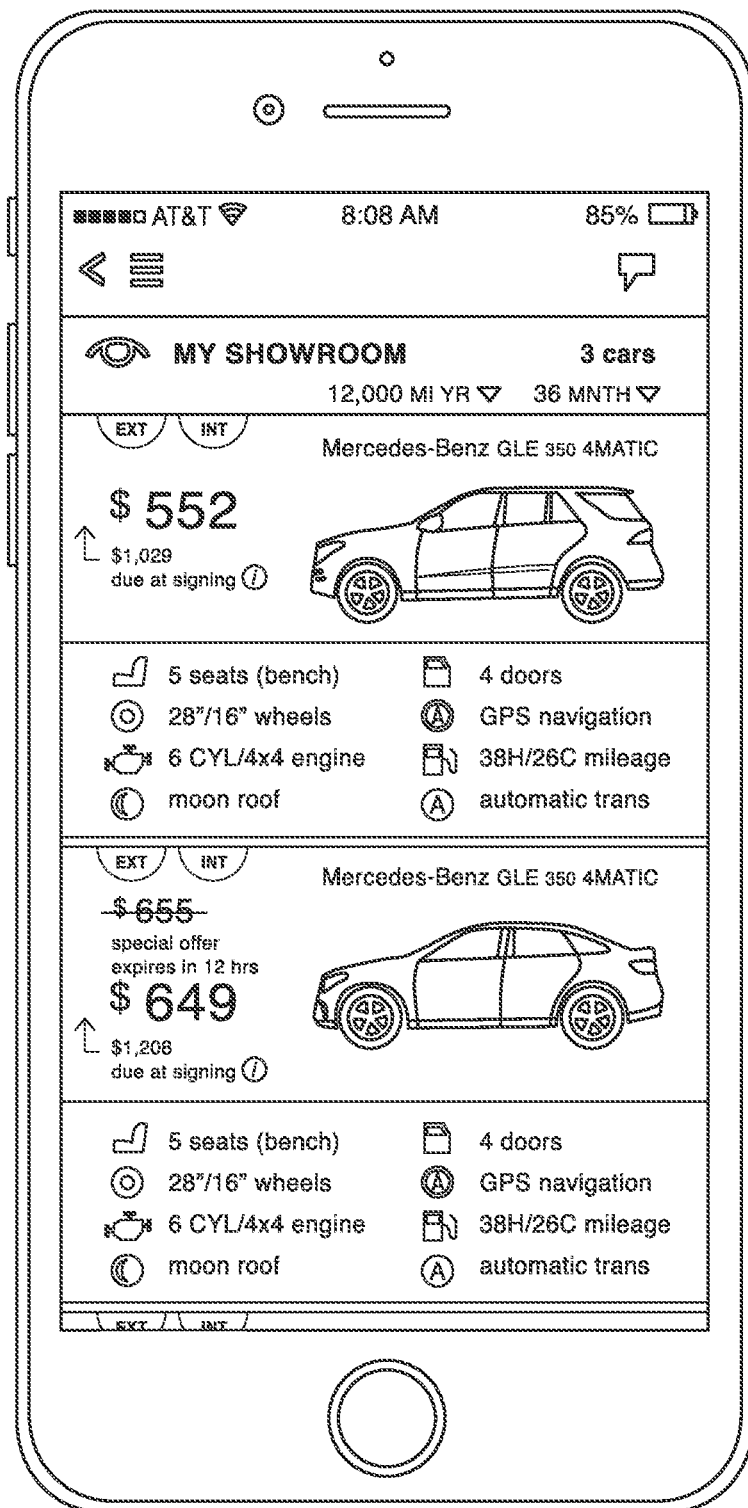
FIG. 15 illustrates an exemplary showroom graphical user interface of a phone app in accordance with one or more preferred implementations.

FIG. 15 illustrates an exemplary showroom graphical user interface of a phone app in accordance with one or more preferred implementations. Preferably, a showroom graphical user interface includes additional specifications and details regarding vehicle listings.

Figure 16:
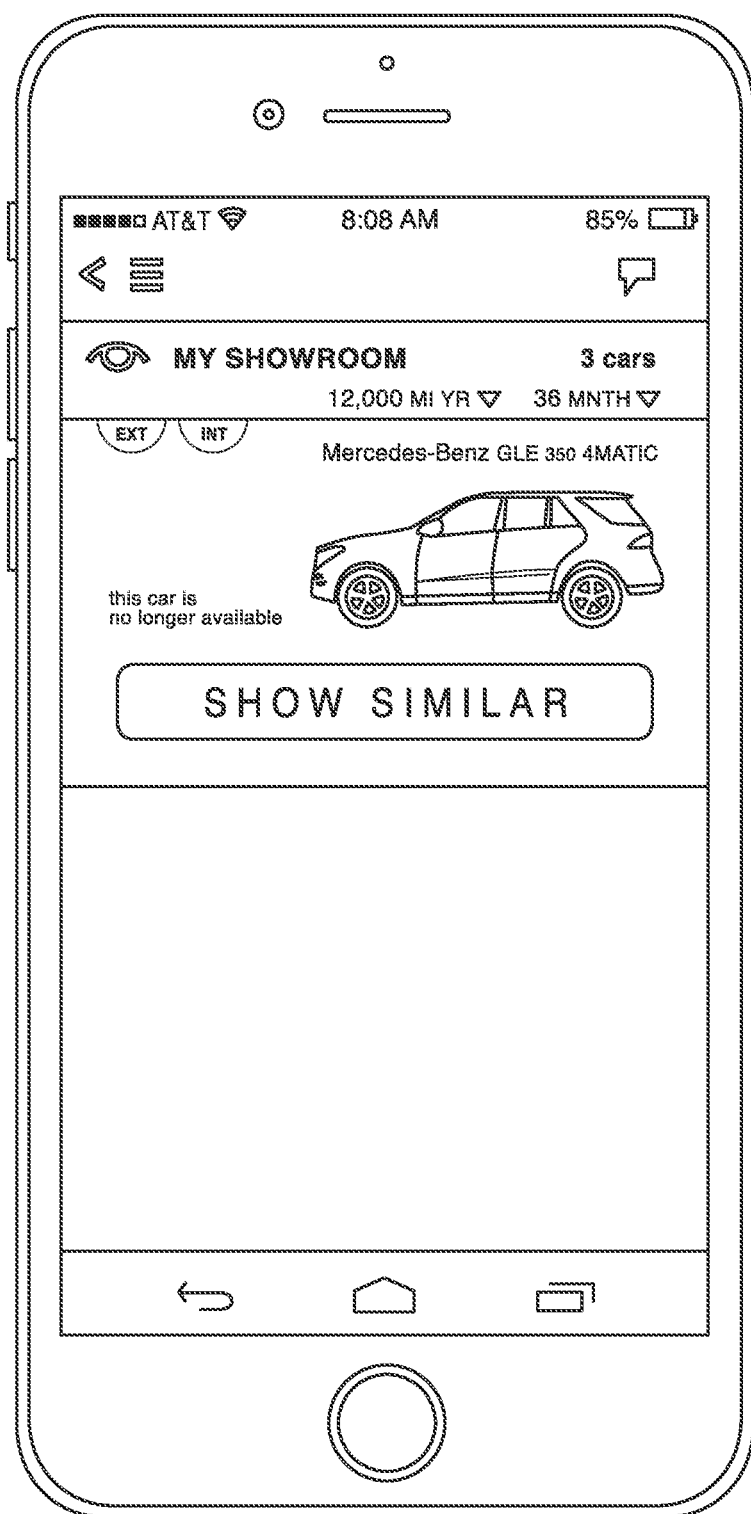
FIG. 16 illustrates an exemplary graphical user interface indicating to a user that a vehicle in his or her showroom is no longer available, and providing a user interface element configured to allow a user to access and view listings for similar vehicles.

In accordance with one or more preferred implementations, if a user has added a vehicle to his or her showroom and subsequently the vehicle is no longer available (e.g. it was leased by another user), then the leasing platform preferably will display a user interface element configured to allow a user to access and view listings for similar vehicles. FIG. 16 illustrates an exemplary graphical user interface indicating to a user that a vehicle in his or her showroom is no longer available, and providing a user interface element configured to allow a user to access and view listings for similar vehicles.

In accordance with one or more preferred implementations, from either a vehicle browsing graphical user interface or a showroom graphical user interface, a user can swipe left on a particular listing to remove that listing, or swipe right on a particular listing to access more information (e.g. vehicle specifications and leasing options) for the vehicle corresponding to that listing.

Figure 17:
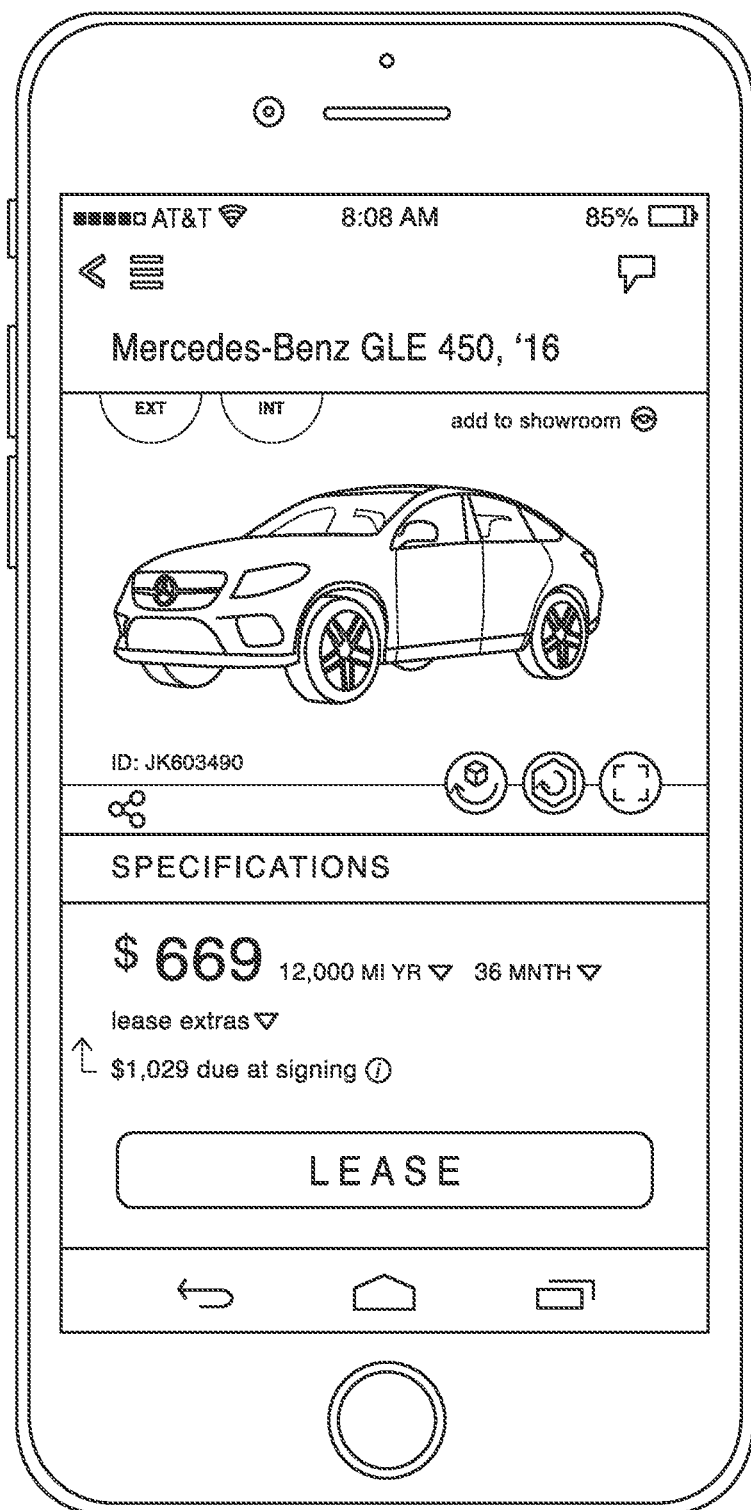
FIG. 17 illustrates an exemplary listing graphical user interface in accordance with one or more preferred implementations.

FIG. 17 illustrates an exemplary listing graphical user interface in accordance with one or more preferred implementations accessed by swiping right on a particular listing. In accordance with one or more preferred implementations, a listing graphical user interface allows as user to select or modify a lease term, lease mileage allowance, or lease extras.

In accordance with one or more preferred implementations, a displayed lease monthly payment (and/or required amount down) will be updated based on user selections.

Figure 18:
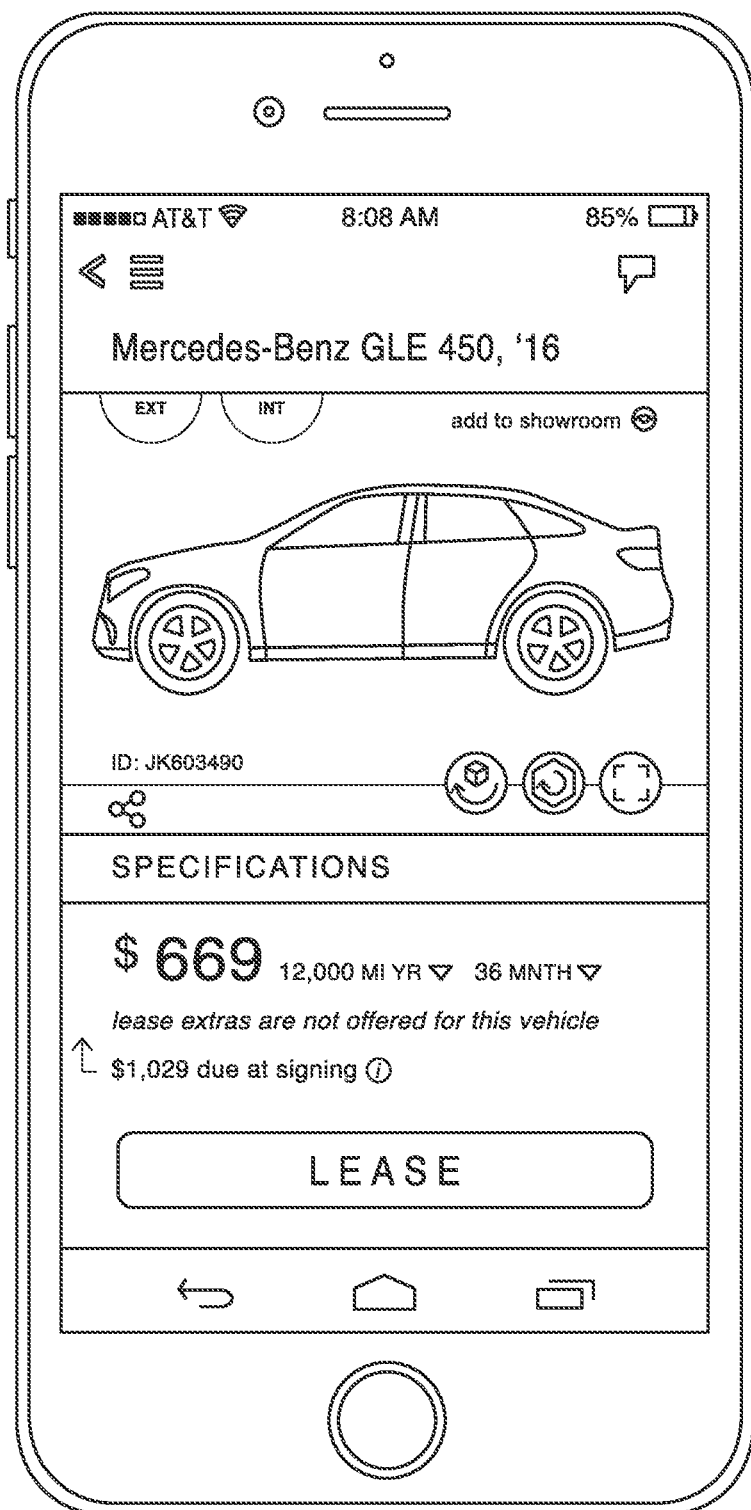
FIG. 18 illustrates an indication that lease extras are not available for a particular vehicle.

In accordance with one or more preferred implementations, a listing graphical user interface will preferably indicate if an option is not available. For example, FIG. 18 illustrates an indication that lease extras are not available for a particular vehicle.

Figure 19:
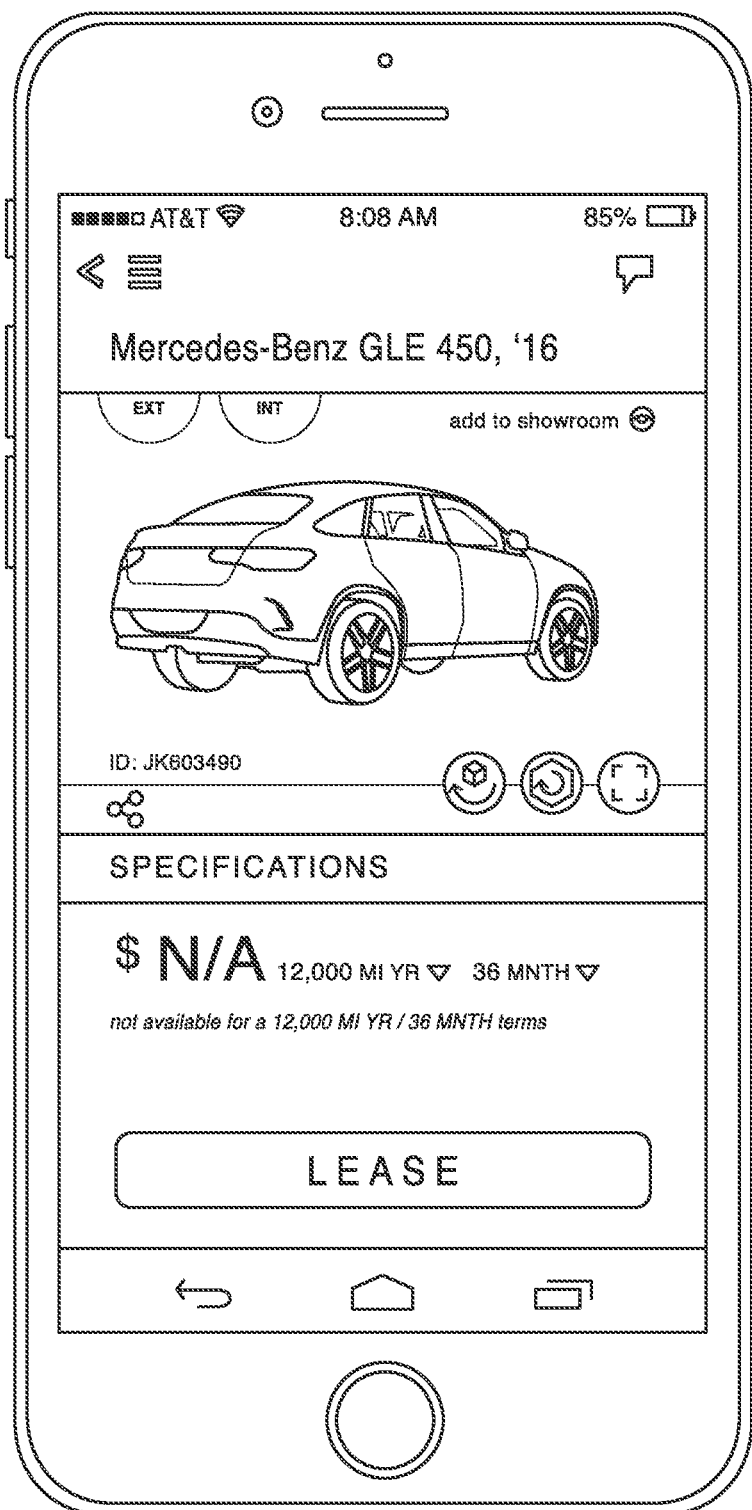
FIG. 19 illustrates that a lease is not available for the selected lease term and mileage allowance combination.

In accordance with one or more preferred implementations, a listing graphical user interface will similarly indicate if a selected lease term, lease mileage allowance, or combination thereof is not available. For example, FIG. 19 illustrates that a lease is not available for the selected lease term and mileage allowance combination.

Figure 20:
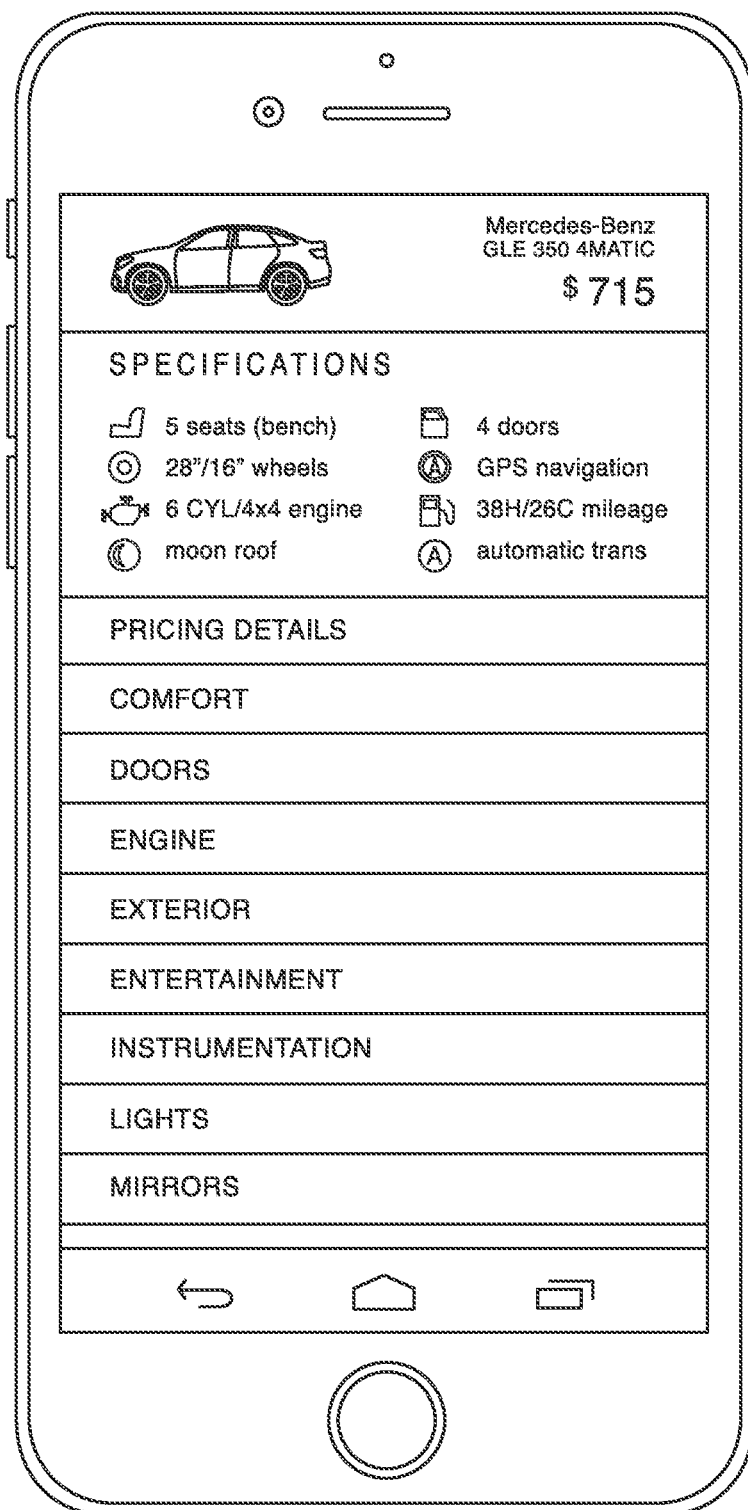
FIG. 20 illustrates an exemplary specification graphical user interface which provides additional specification details for a vehicle.
Figure 21:
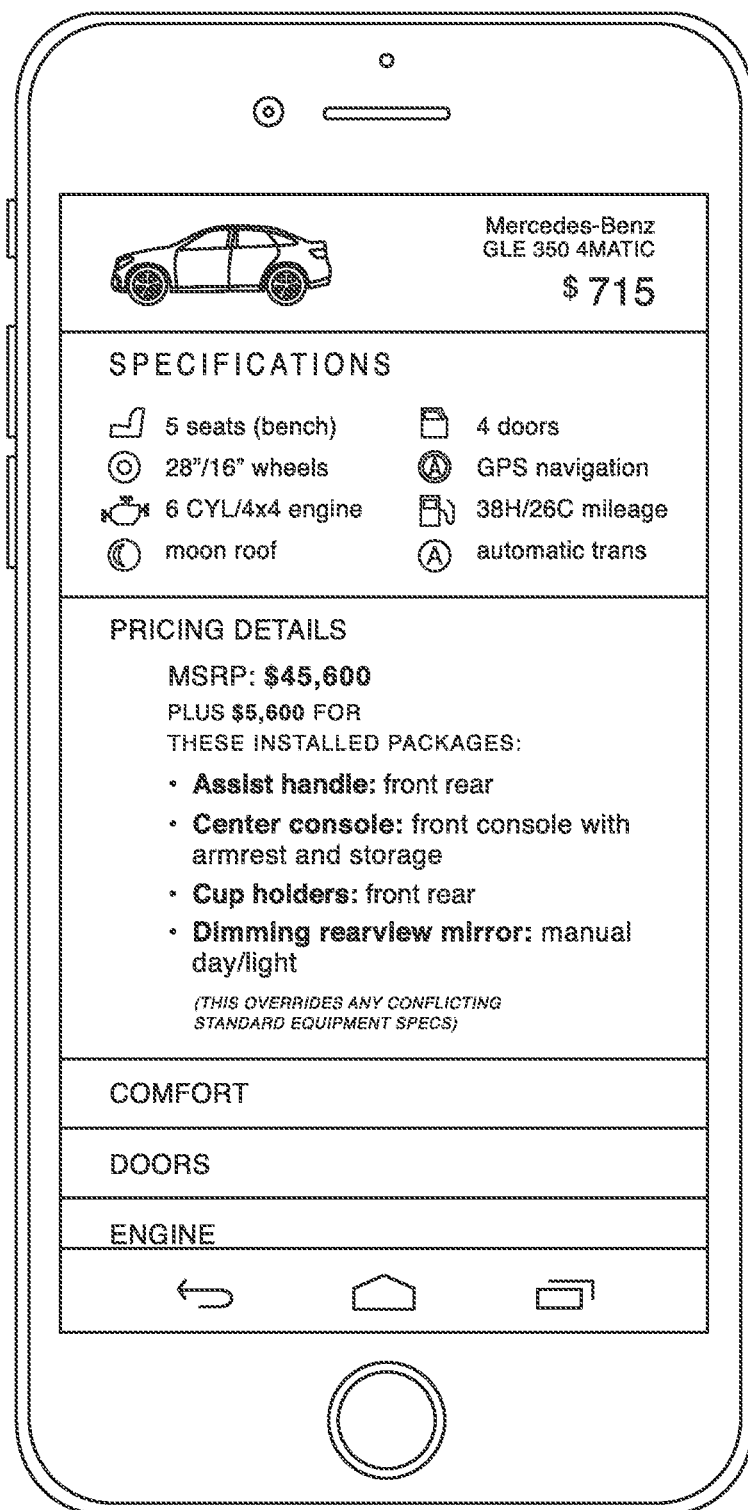
FIG. 21 illustrates the display of pricing details in an exemplary specification graphical user interface.
Figure 22:
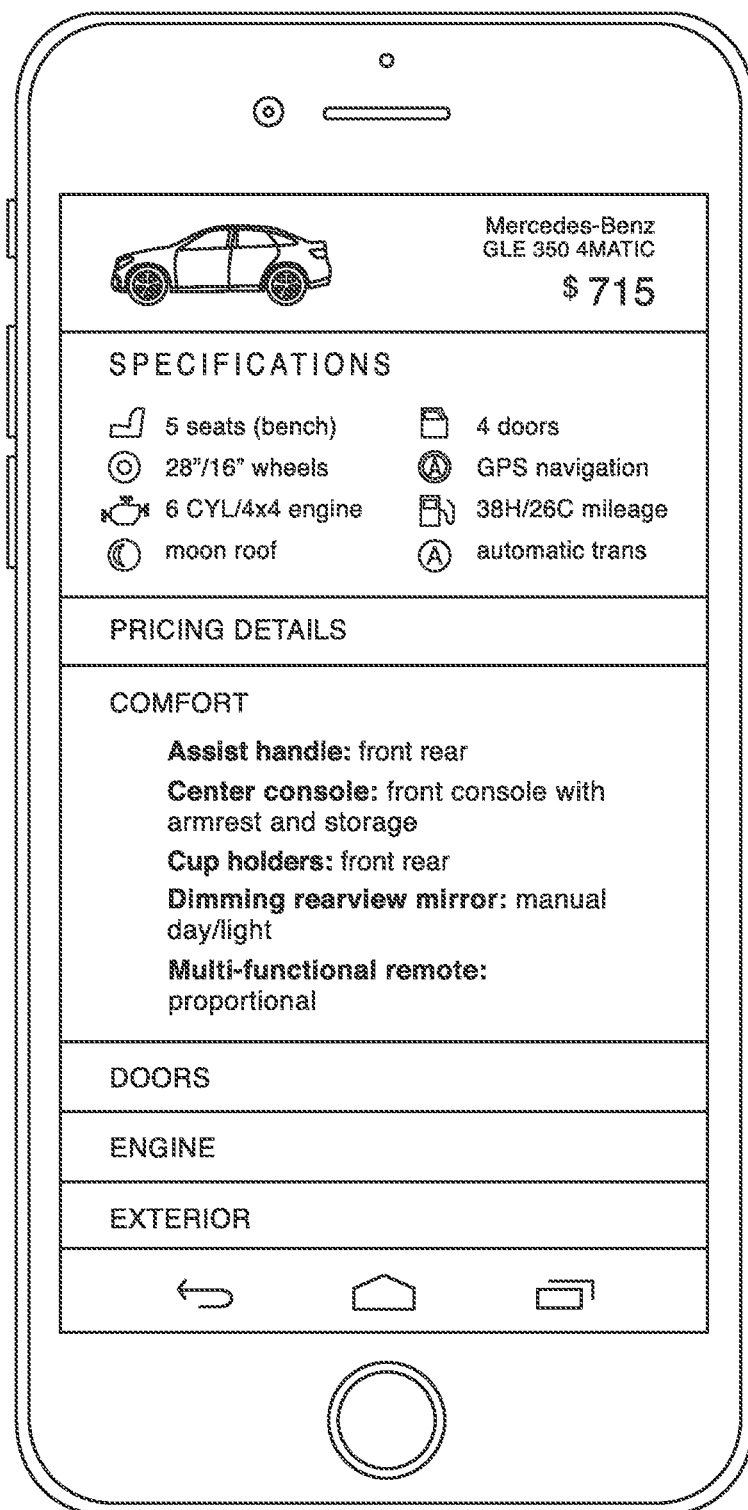
FIG. 22 illustrates the display of comfort or luxury details in an exemplary specification graphical user interface.

In accordance with one or more preferred implementations, from a listing graphical user interface a user is able to access additional specification details for a vehicle. FIG. 20 illustrates an exemplary specification graphical user interface which provides additional specification details for a vehicle. In accordance with one or more preferred implementations, a specification graphical user interface includes a plurality of sections which a user can interact with to display particular specification details. For example, FIG. 21 illustrates the display of pricing details in an exemplary specification graphical user interface and FIG. 22 illustrates the display of comfort or luxury details in an exemplary specification graphical user interface.

Figure 23:
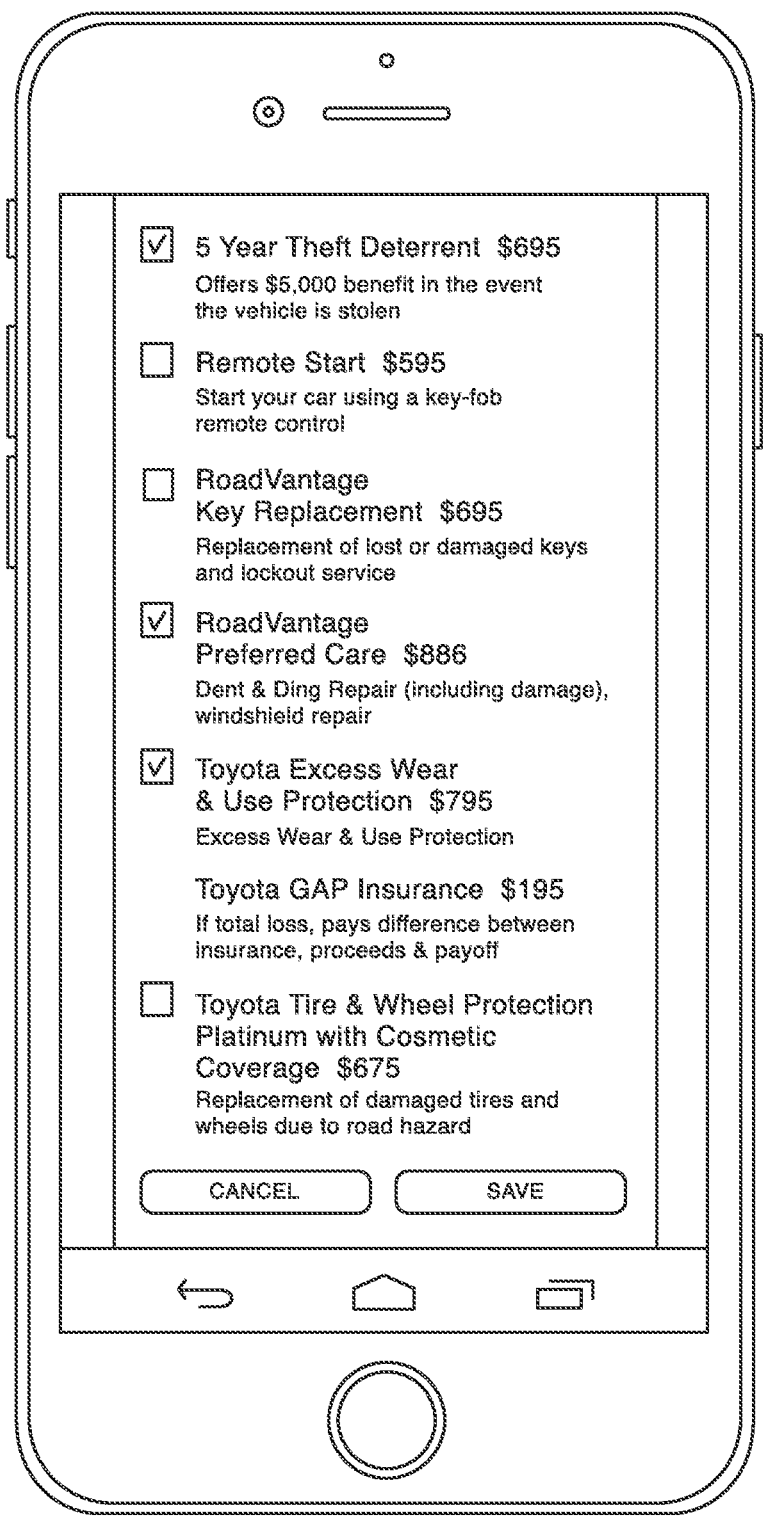
FIG. 23 illustrates an exemplary graphical user interface presenting packages or lease extras to a user for selection or deselection.

In accordance with one or more preferred implementations, a user may be able to select one or more packages for addition to a lease. In accordance with one or more preferred implementations, these may be accessible as lease extras from a listing graphical user interface. In accordance with one or more preferred implementations, these may be automatically presented to a user as part of the process of leasing a vehicle. FIG. 23 illustrates an exemplary graphical user interface presenting packages or lease extras to a user for selection or deselection.

Figure 24:
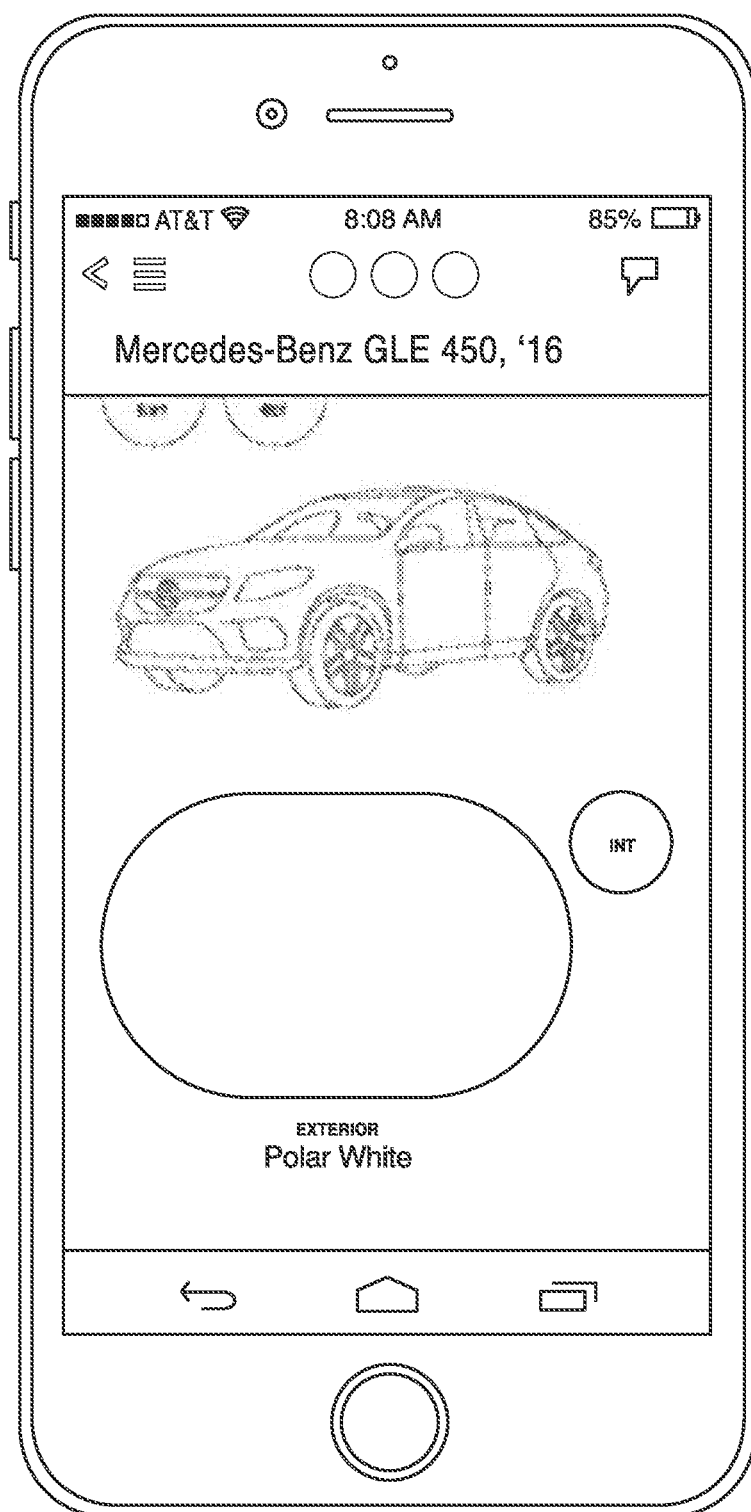
FIGS. 24-25 illustrate exemplary graphical user interfaces including an enhanced display of color information for a vehicle.
Figure 25:
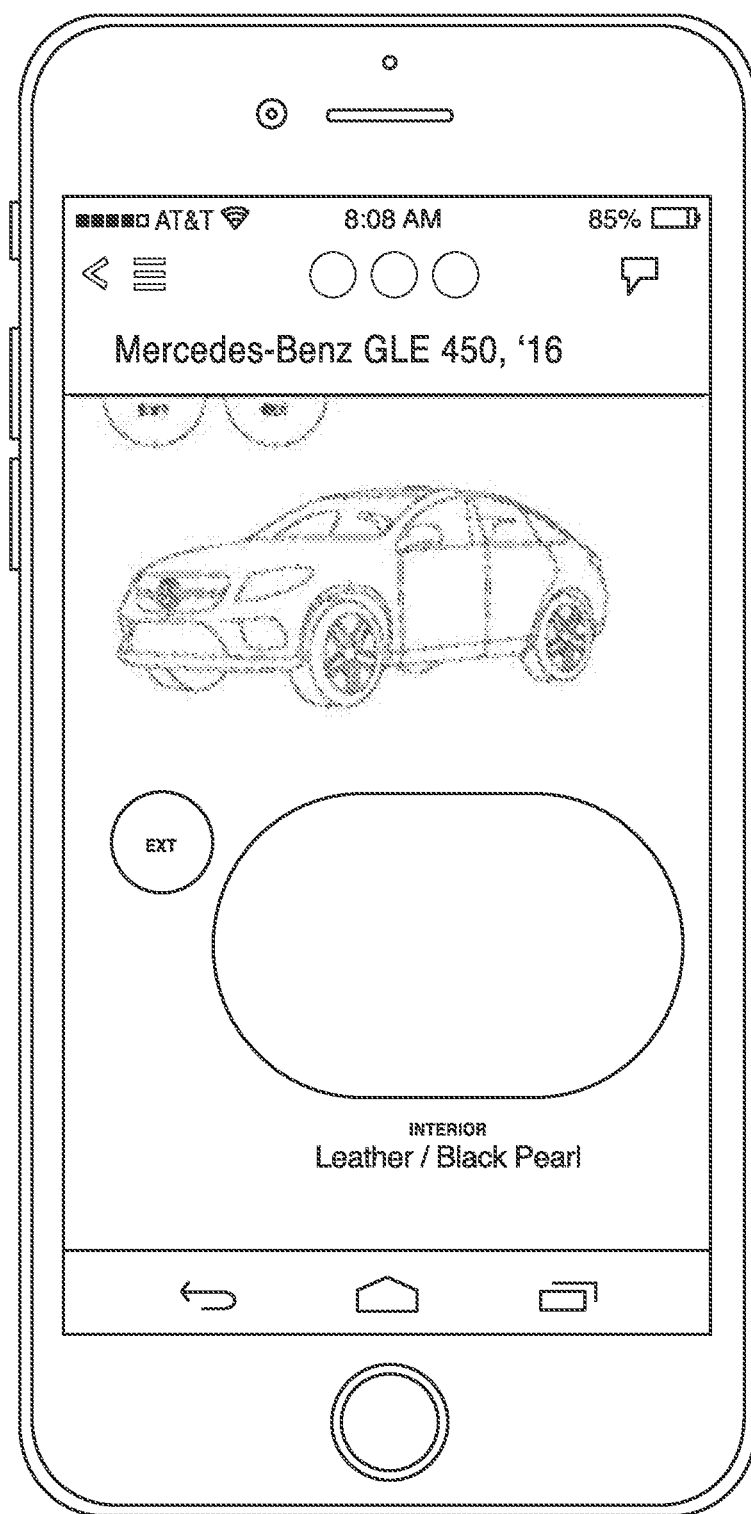

In accordance with one or more preferred implementations, a listing graphical user interface includes a user interface element indicating one or more interior colors for the vehicle, and a user interface element indicating one or more exterior colors for the vehicle corresponding to the listing. In accordance with one or more preferred implementations, a user can interact with one of these user interface elements to access an enhanced display of color information for the vehicle. FIGS. 24-25 illustrate exemplary graphical user interfaces including an enhanced display of color information for a vehicle.

In accordance with one or more preferred implementations, a listing graphical user interface is configured to allow a user to access additional views for a vehicle. In accordance with one or more preferred implementations, a listing graphical user interface includes a user interface element for accessing an enlarged basic view for the vehicle, a user interface element for accessing an interior view for the vehicle, and a user interface element for accessing an exterior view for the vehicle.

Figure 26:
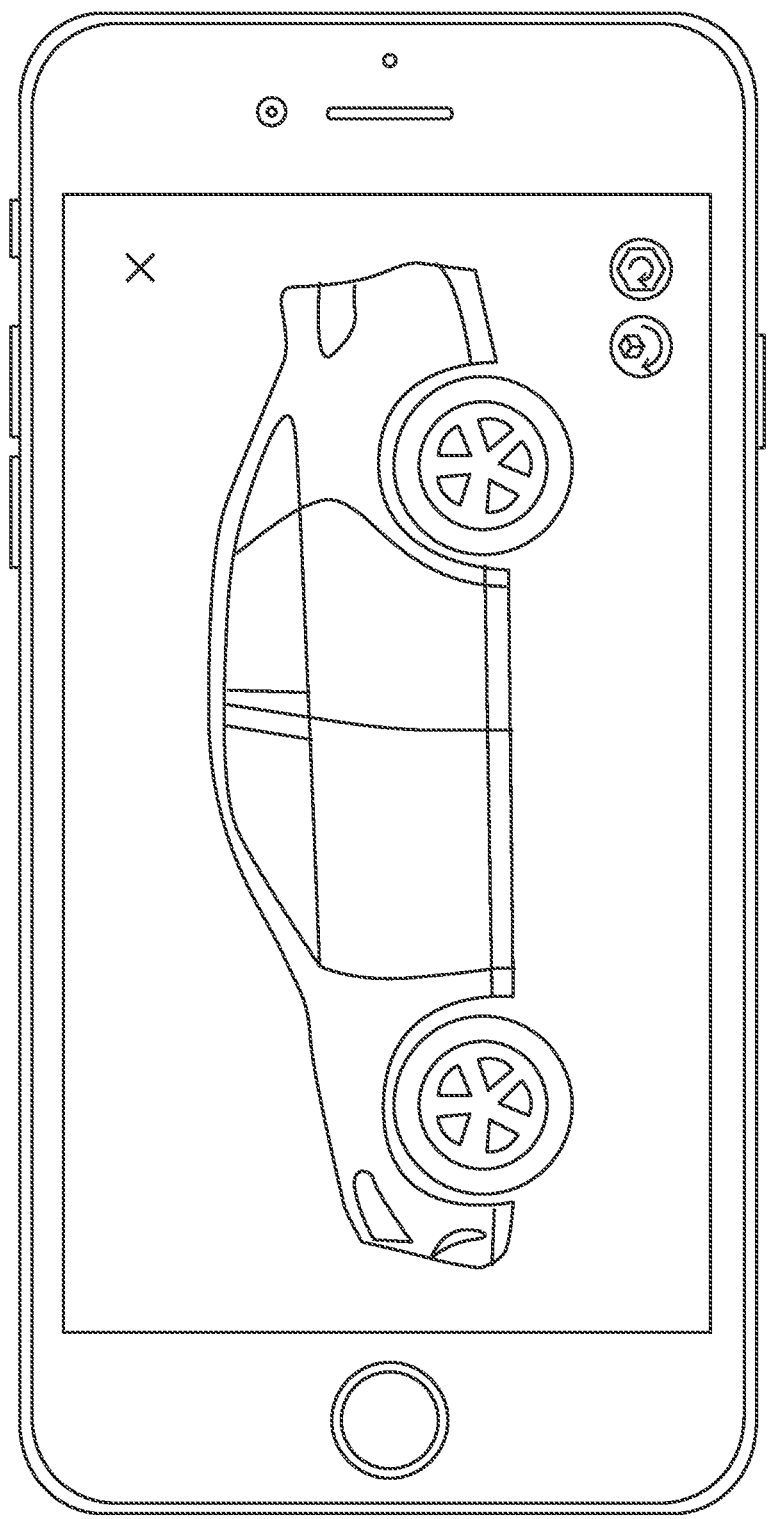
FIG. 26 illustrates an exemplary graphical user interface displaying an enlarged basic view for a vehicle.

FIG. 26 illustrates an exemplary graphical user interface displaying an enlarged basic view for a vehicle. Preferably, this graphical user interface preferably includes a user interface element for accessing an interior view for the vehicle, and a user interface element for accessing an exterior view for the vehicle.

Figure 27:
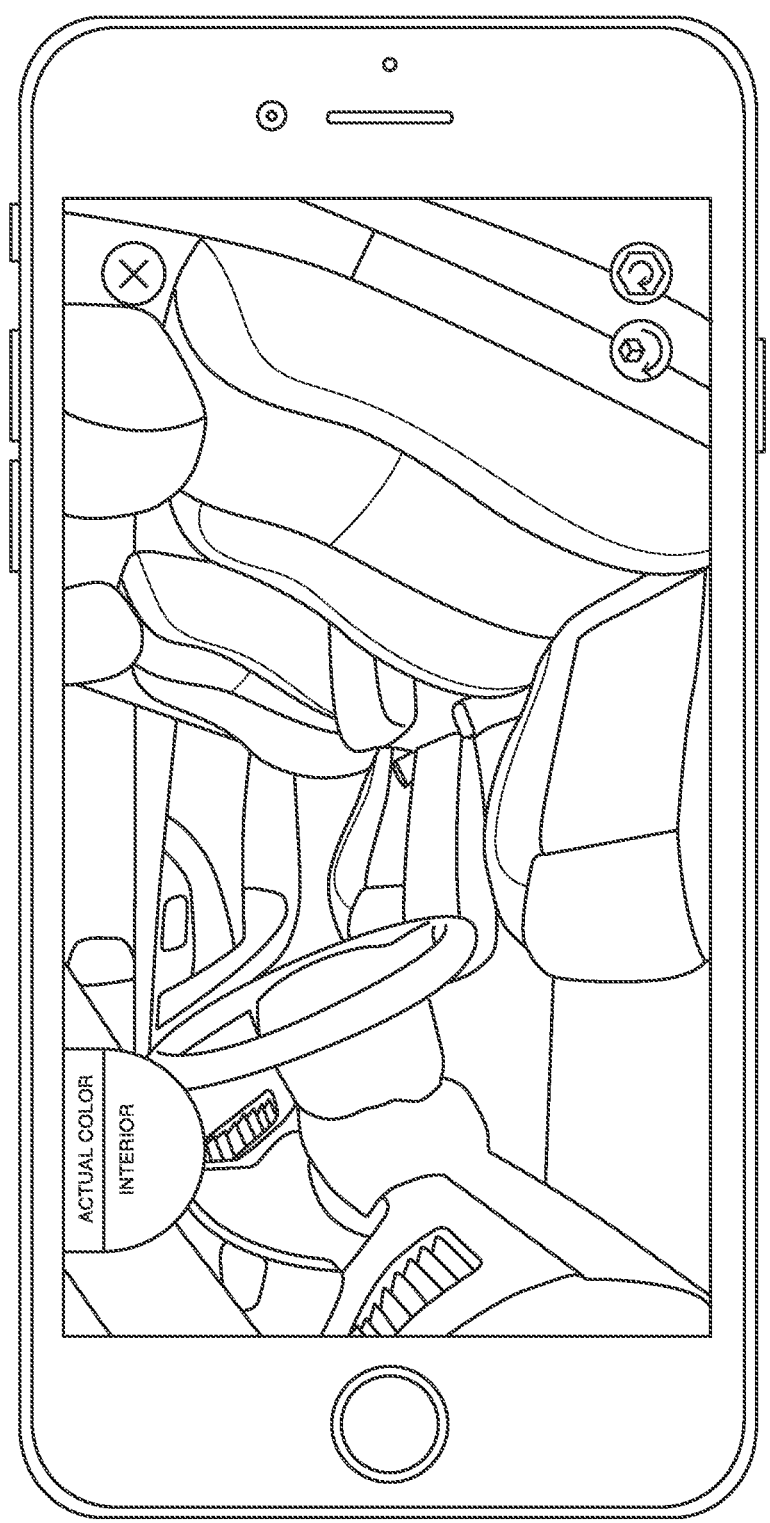
FIG. 27 illustrates an exemplary graphical user interface displaying an interior view for a vehicle.

FIG. 27 illustrates an exemplary graphical user interface displaying an interior view for a vehicle. In accordance with one or more preferred implementations, this graphical user interface displays a color indicator indicating one or more interior colors of the vehicle. In accordance with one or more preferred implementations, this graphical user interface displays a color key for a stock photograph indicating the color scheme for the vehicle the user is considering leasing and how that color scheme maps to the illustrated color scheme. In accordance with one or more preferred implementations, the color scheme can be selected or updated by the user. In accordance with one or more preferred implementations, a user can move and rotate the displayed view. Preferably, this graphical user interface includes a user interface element for accessing an enlarged basic view for the vehicle, and a user interface element for accessing an exterior view for the vehicle.

Figure 28:
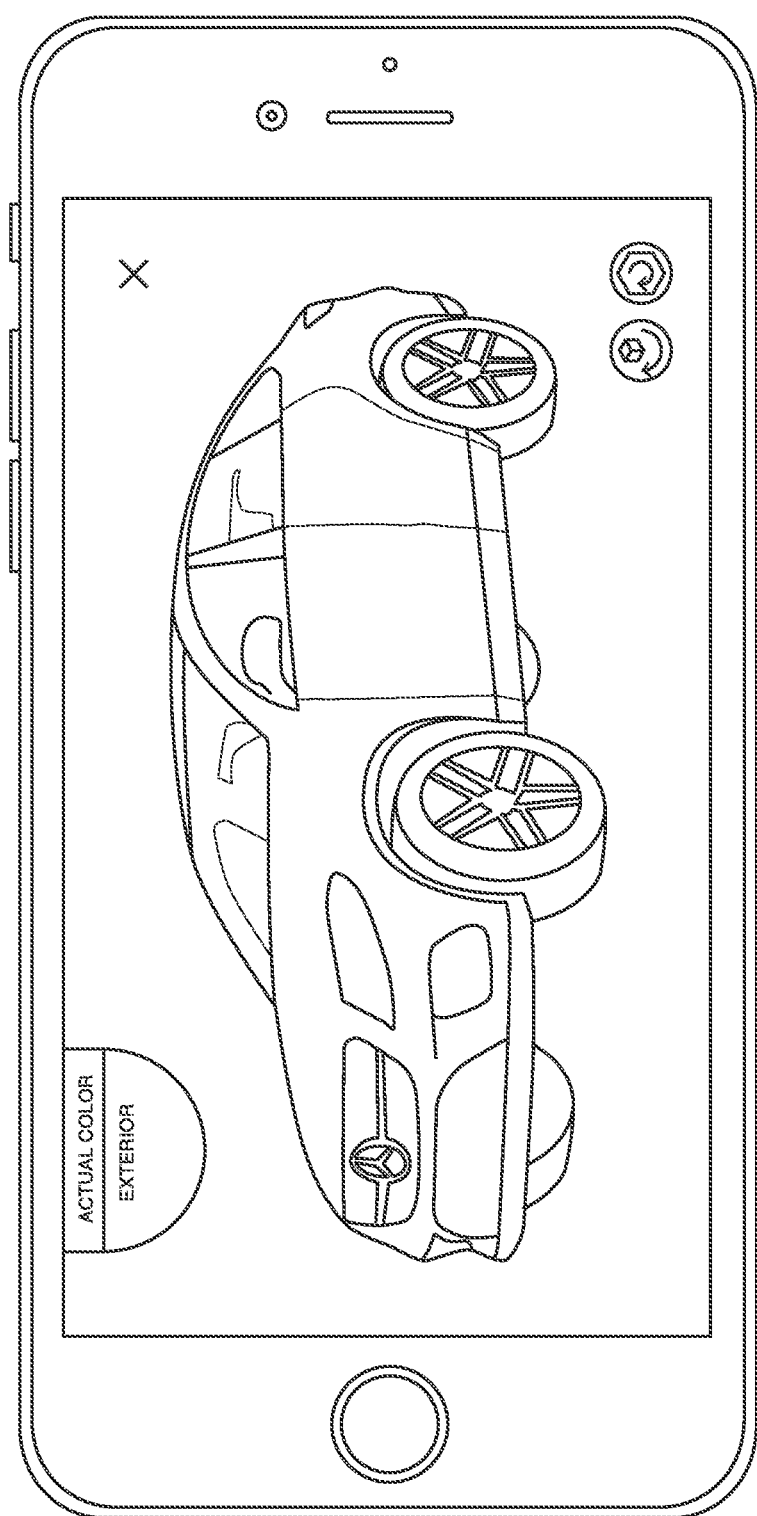
FIG. 28 illustrates an exemplary graphical user interface displaying an exterior view for a vehicle.

FIG. 28 illustrates an exemplary graphical user interface displaying an exterior view for a vehicle. In accordance with one or more preferred implementations, this graphical user interface displays a color indicator indicating one or more exterior colors of the vehicle. In accordance with one or more preferred implementations, this graphical user interface displays a color key for a stock photograph indicating the color scheme for the vehicle the user is considering leasing and how that color scheme maps to the illustrated color scheme. In accordance with one or more preferred implementations, the color scheme can be selected or updated by the user. In accordance with one or more preferred implementations, a user can move and rotate the displayed view. Preferably, this graphical user interface includes a user interface element for accessing an enlarged basic view for the vehicle, and a user interface element for accessing an interior view for the vehicle.

Figure 29:
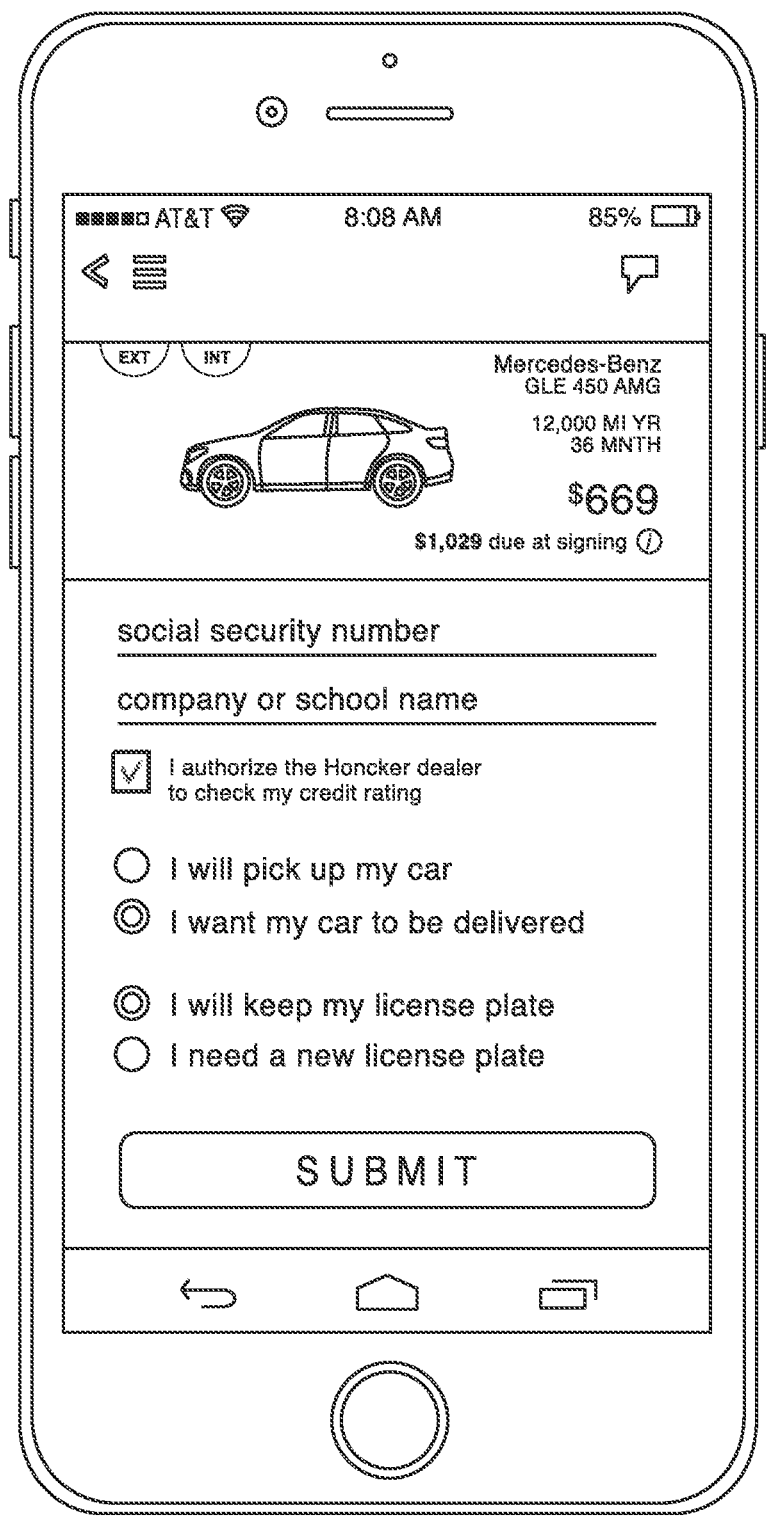
FIG. 29 illustrates an exemplary graphical user interface requested additional information from a user.

In accordance with one or more preferred implementations, once a user has selected a vehicle he or she desires to lease and confirmed his or her interest (e.g. via engaging a lease user interface element on a listing graphical user interface), a user will be prompted for some additional information for the lease. FIG. 29 illustrates an exemplary graphical user interface requested additional information from a user. Preferably, a user is queried for his or her social security number (or tax ID), company or school name, credit check authorization (e.g. for a hard credit check by a leasing platform provider or dealership), pick up or delivery preference, and license plate preference (e.g. keep old license plate or request new license plate).

Figure 30:
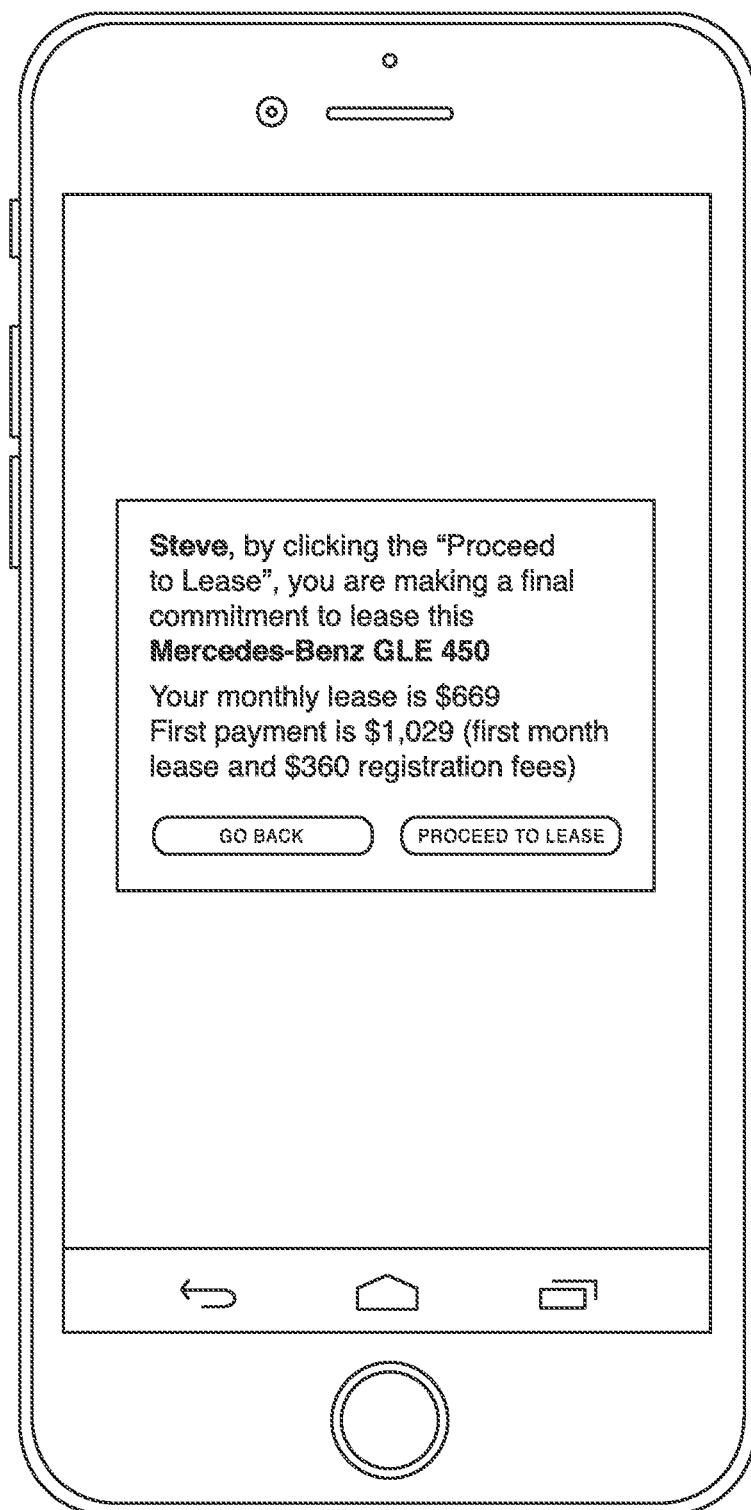
FIG. 30 illustrates an exemplary graphical user interface prompting a user to confirm their agreement to lease a vehicle.

Preferably, upon submitting this information a user is prompted to confirm their agreement to lease the vehicle at the indicated monthly lease payment and first payment. FIG. 30 illustrates an exemplary graphical user interface prompting a user to confirm their agreement to lease a vehicle.

In accordance with one or more preferred implementations, upon confirming their agreement to lease the vehicle, lease request information for the user is communicated to a leasing platform (e.g. a leasing platform server), as illustrated in FIG. 2. Preferably, an indication of the requested lease is then presented to the dealer for that vehicle in the dealer dashboard for that dealer.

In accordance with one or more preferred implementations, even after confirming their agreement to lease a vehicle, a user will sometimes need to provide additional documents or pieces of information. In accordance with one or more preferred implementations, a leasing platform comprises a smart dealer-customer communication component that uses smart algorithms to automatically or manually request paperwork from a user (e.g. customer).

Figure 31:
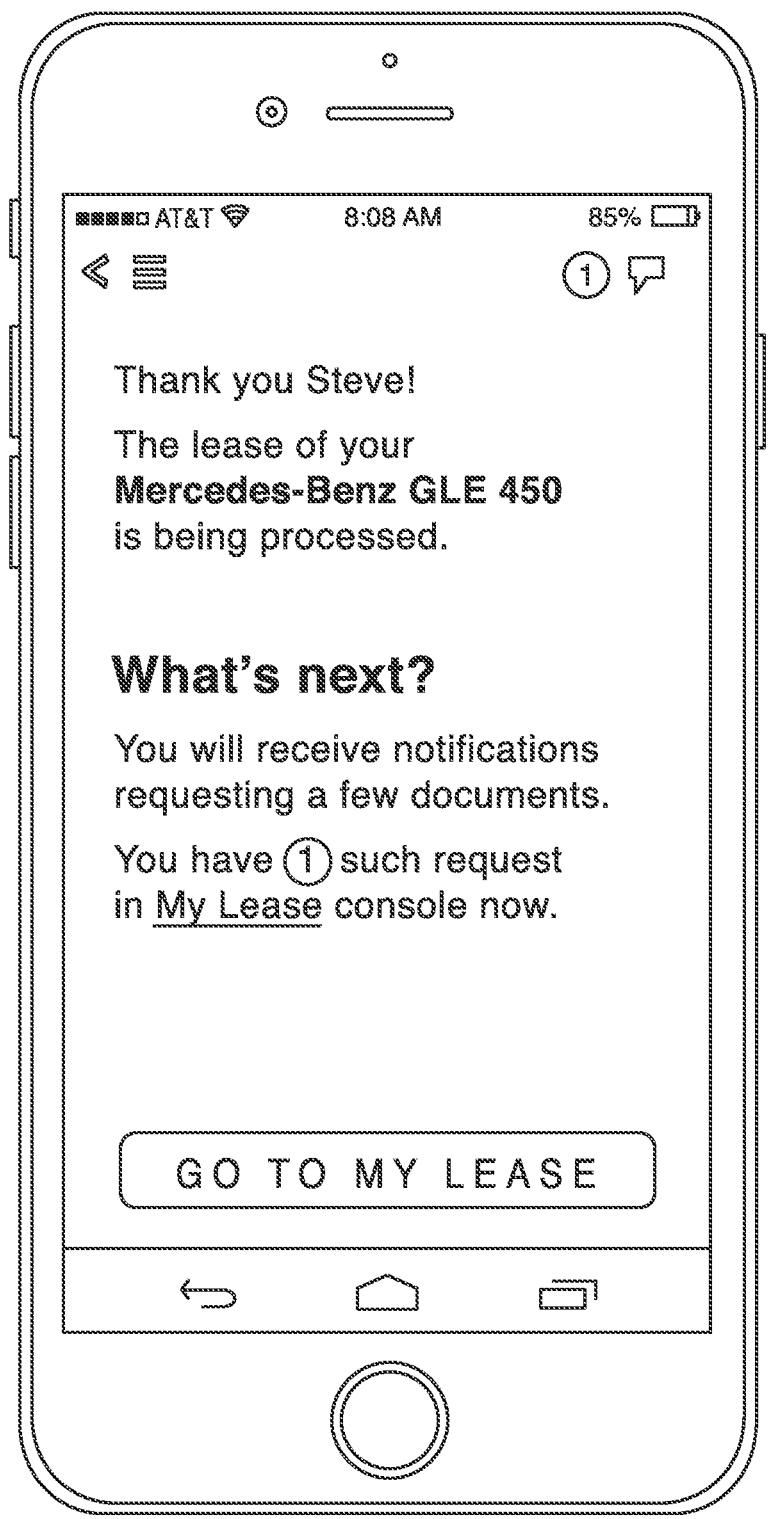
FIG. 31 illustrate an exemplary graphical user interface informing a user that they will receive notifications requesting a few documents.

FIG. 31 illustrate an exemplary graphical user interface informing a user that they will receive notifications requesting a few documents.

Figure 32:
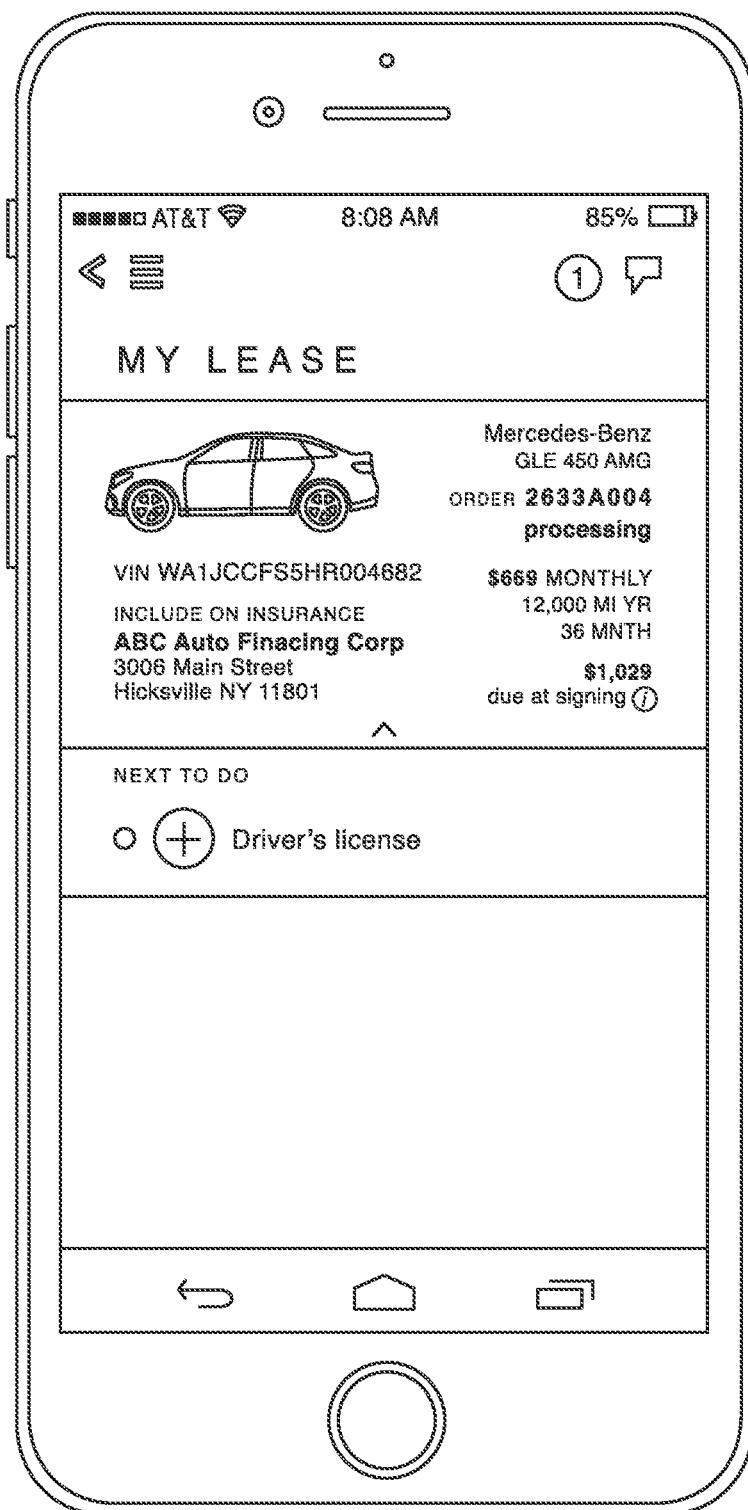
FIG. 32 illustrates an exemplary lease graphical user interface indicating that a user has an outstanding action item.

In accordance with one or more preferred implementations, a leasing platform provides one or more graphical user interfaces which allow a user to easily keep track of and attend to these requests for additional information or documents. FIG. 32 illustrates an exemplary lease graphical user interface indicating that a user has an outstanding action item of providing a copy of their driver's license.

Figure 33:
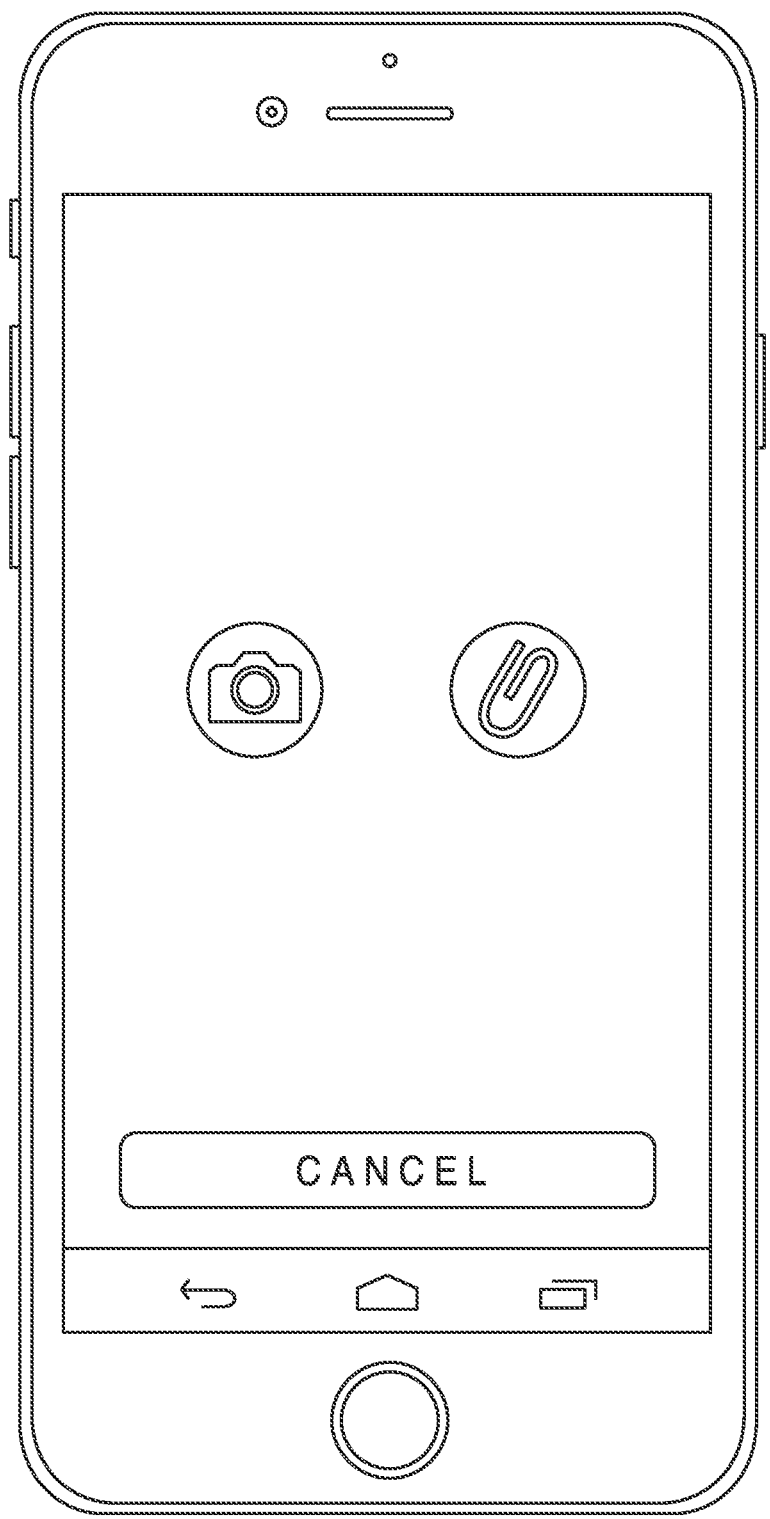
FIG. 33 illustrates an exemplary graphical user interface which allows a user to upload a file or take a photograph to provide a copy of a document or item.
Figure 34:
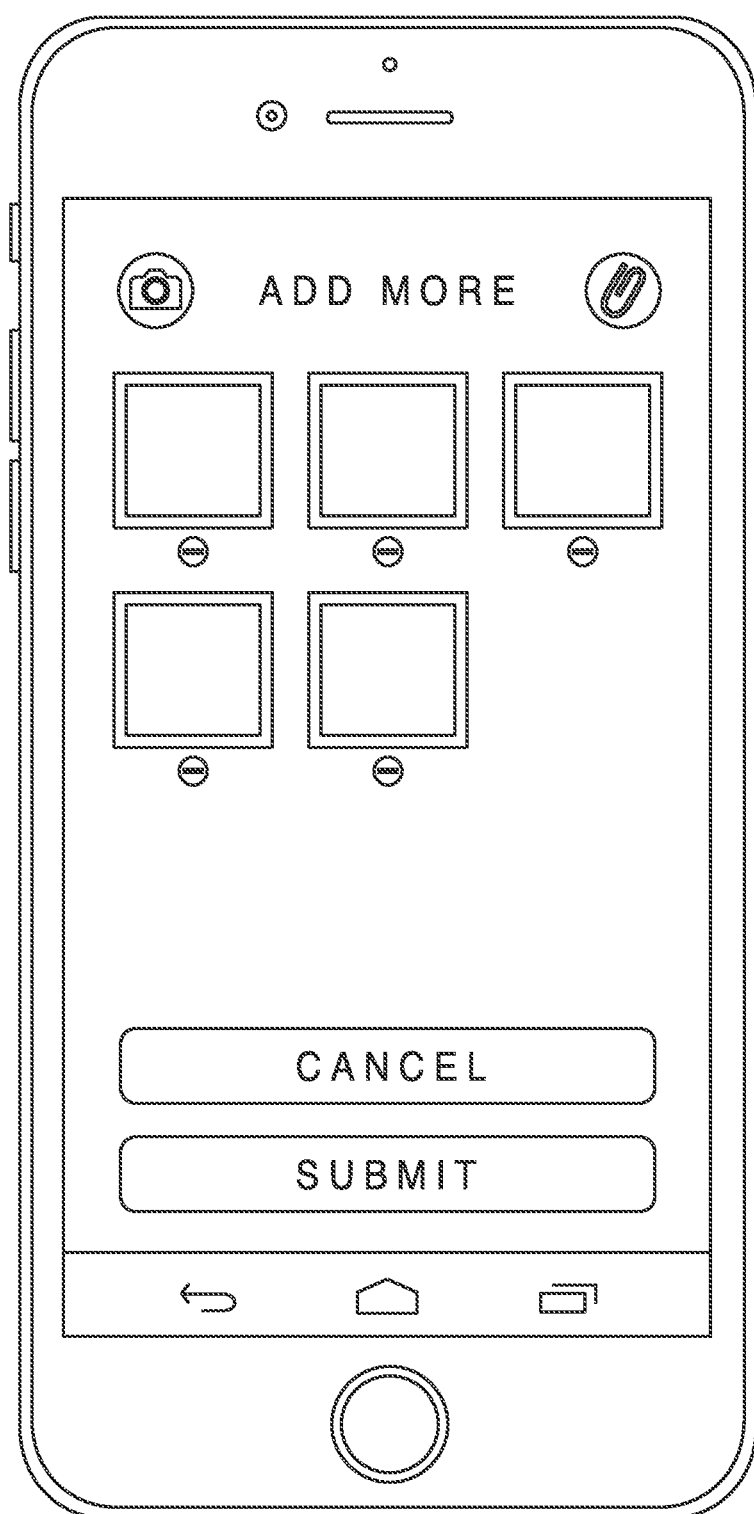
FIG. 34 illustrates an exemplary file upload graphical user interface which allows a user to select a file for upload.

In accordance with one or more preferred implementations, a user can provide a copy of their driver's license by uploading an image file or taking a picture of it with their phone. FIG. 33 illustrates an exemplary graphical user interface which allows a user to upload a file or take a photograph to provide a copy of a document or item (e.g. their driver's license). FIG. 34 illustrates an exemplary file upload graphical user interface which allows a user to select a file for upload.

Figure 35:
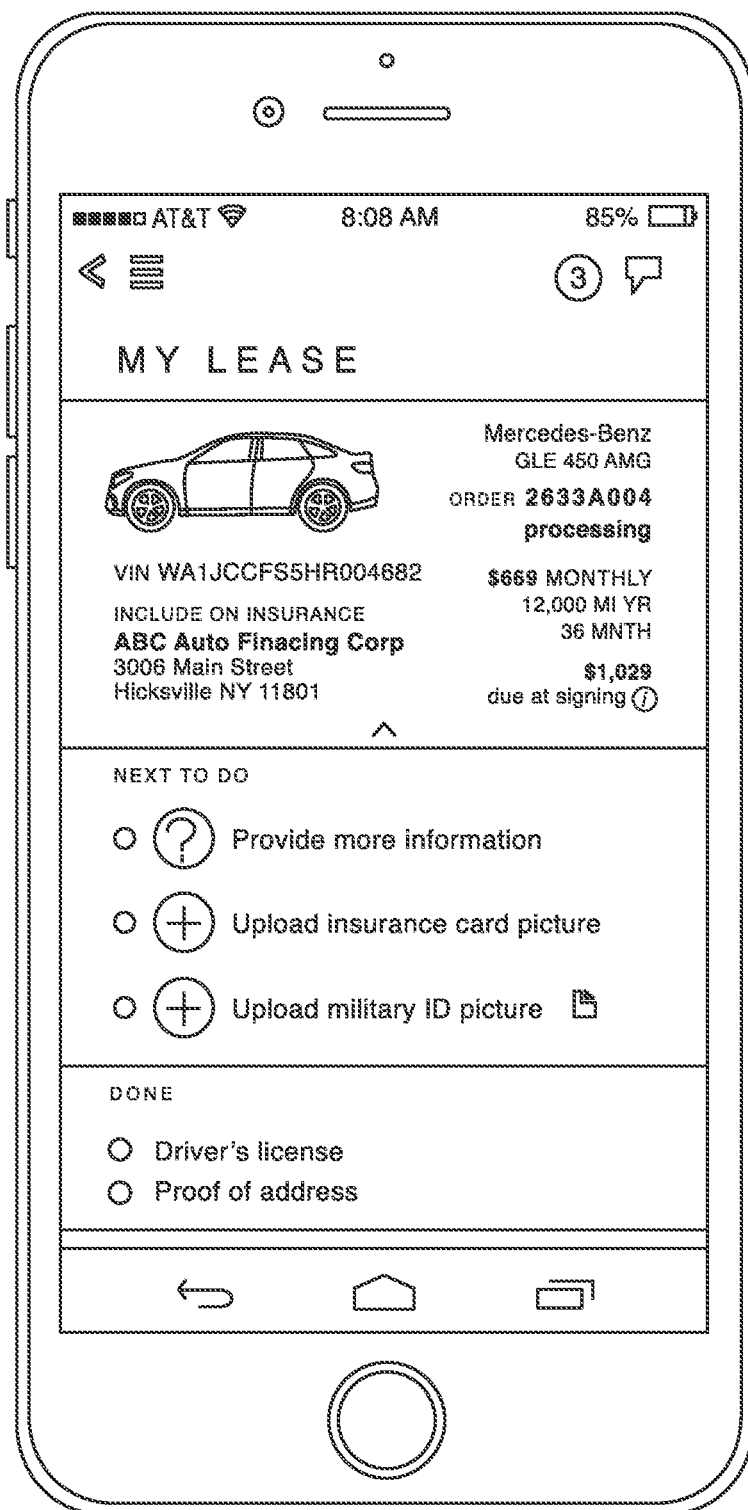
FIG. 35 illustrates an exemplary lease graphical user interface which has been updated to indicate that an action item has been completed.

Preferably, once a user has satisfied an action item, this is indicated on a lease graphical user interface. FIG. 35 illustrates an exemplary lease graphical user interface which has been updated to indicate that a user has provided a copy of his or her driver's license. Preferably, additional required documents, such as proof of insurance, can be similarly provided.

Figure 36:
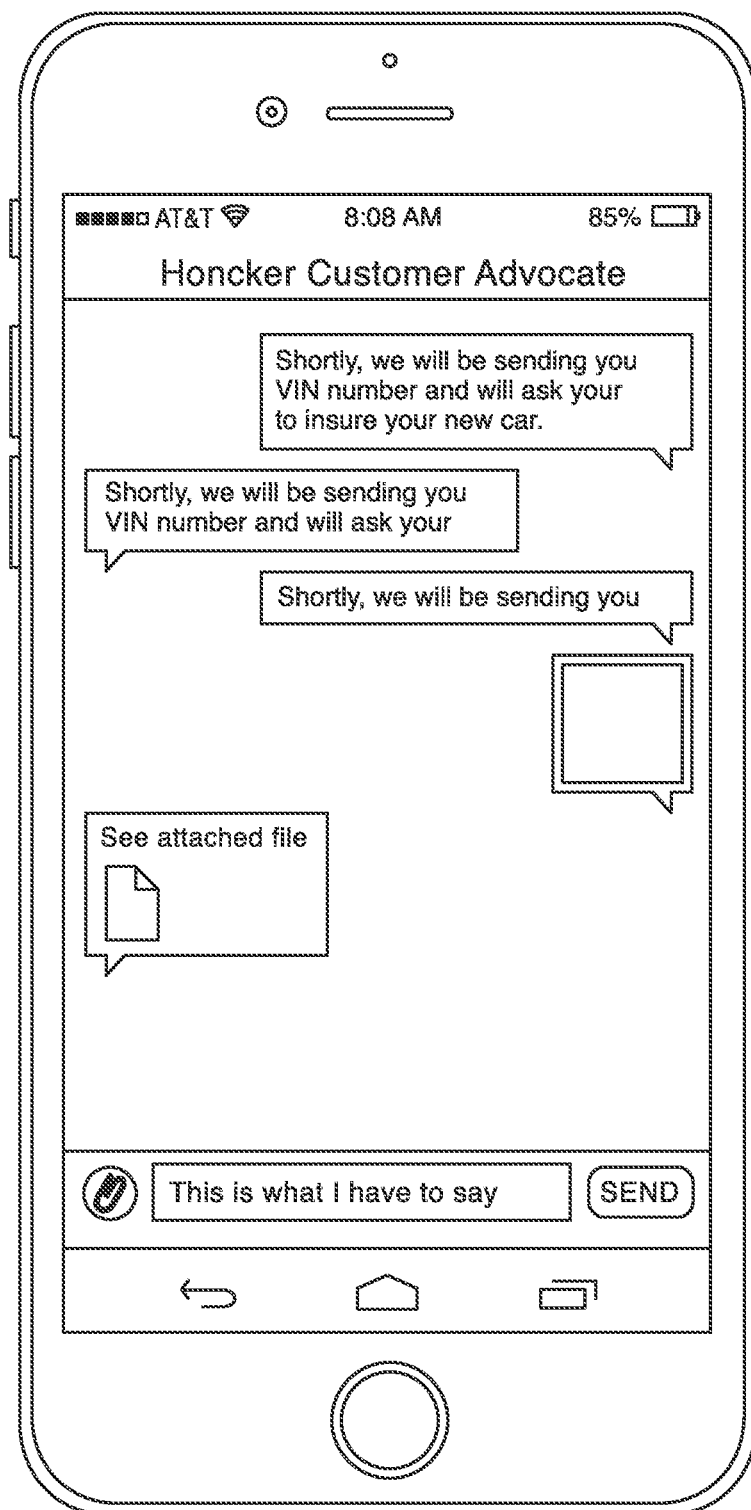
FIG. 36 illustrates an exemplary chat graphical user interface which can display messages regarding necessary documents.

Additionally, in one or more preferred implementations, a leasing platform provider representative or a dealership representative may contact a user and request such documents. In accordance with one or more preferred implementations, this may occur over a messaging system built into a phone app, or over standard text messaging (e.g. short message service (SMS)). FIG. 36 illustrates an exemplary chat graphical user interface which can display messages regarding necessary documents.

Figure 37:
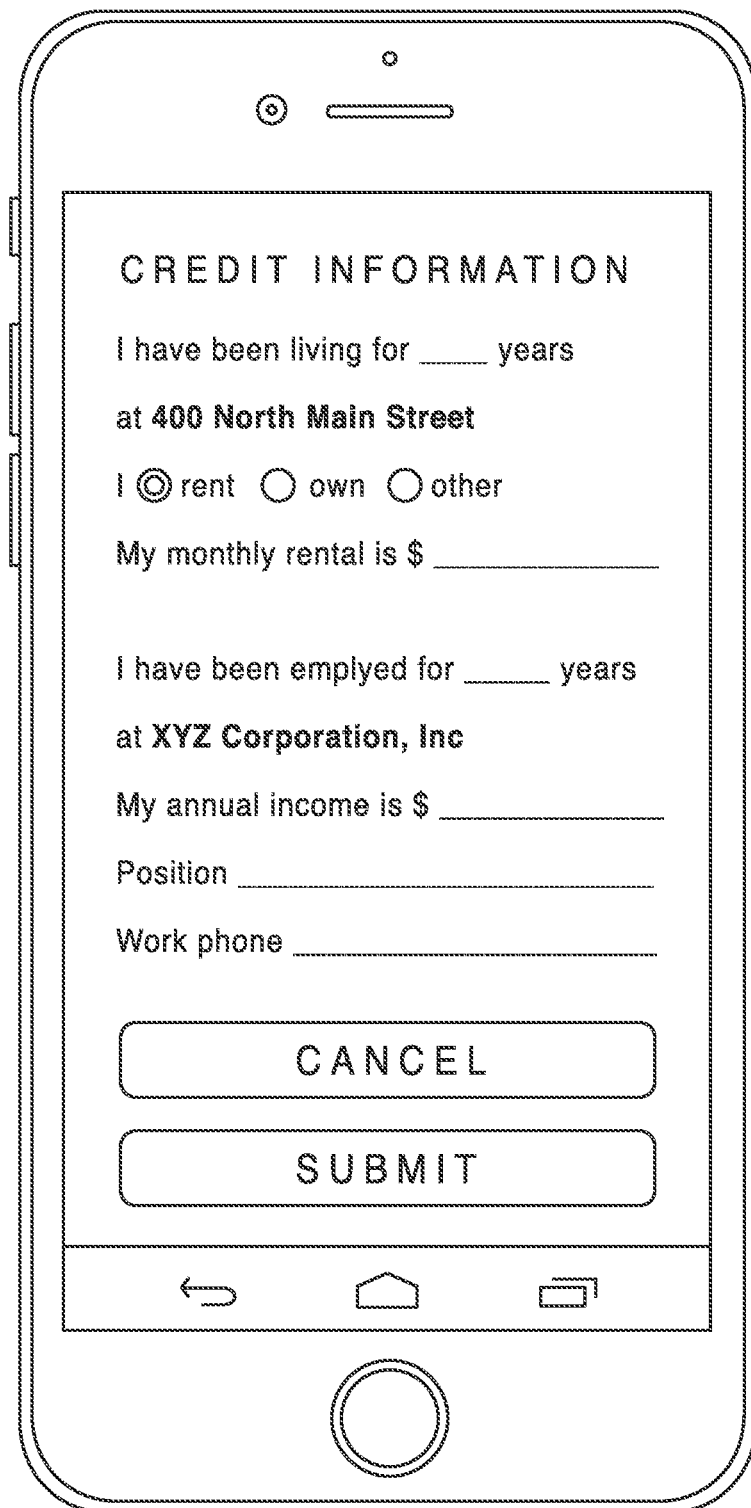
FIG. 37 illustrates an exemplary graphical user interface configured to request additional credit information from a user.

In accordance with one or more preferred implementations, a graphical user interface is utilized to request additional credit, address, or employer information from a user. FIG. 37 illustrates an exemplary graphical user interface configured to request additional credit information from a user.

Figure 38:
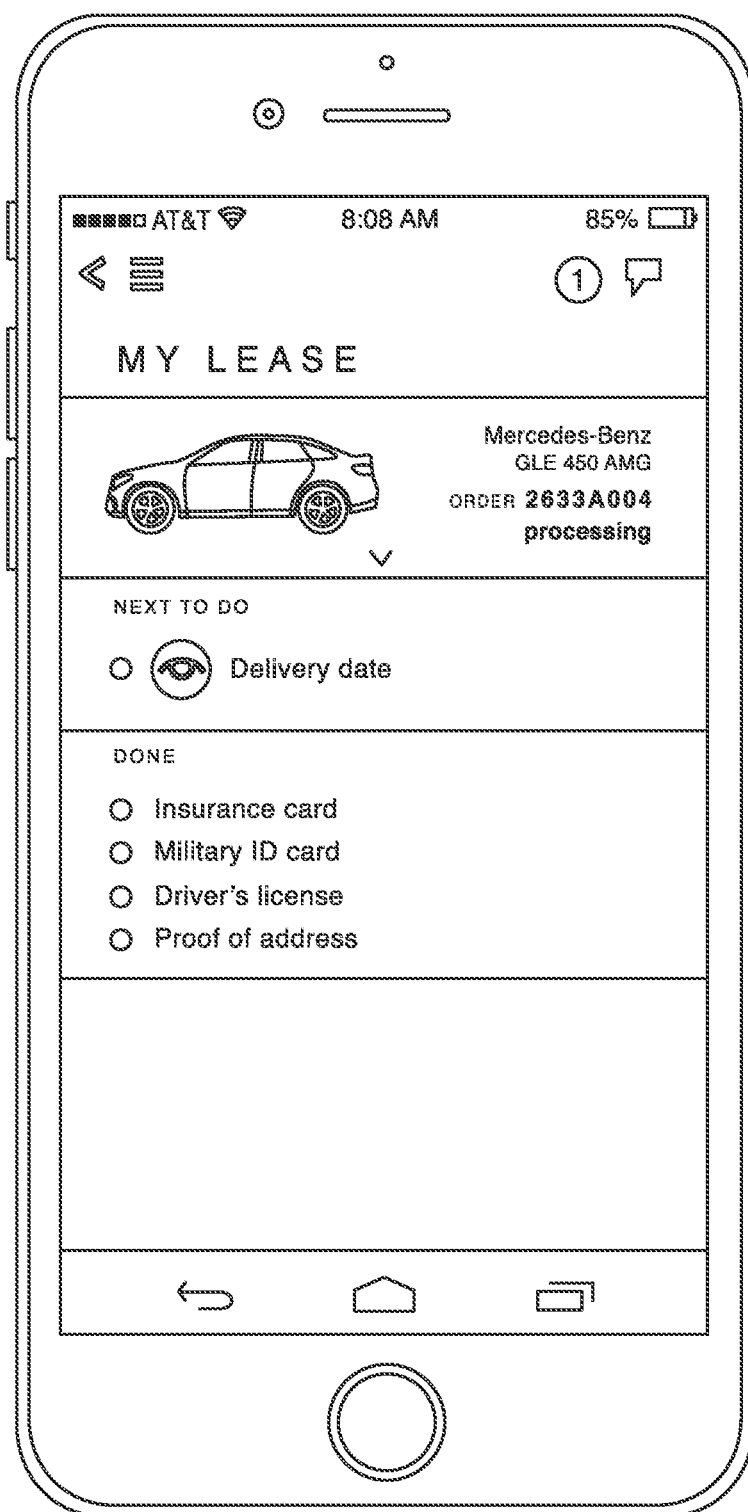
FIG. 38 illustrates an exemplary graphical user interface indicating that a user needs to specify a delivery date for a leased vehicle.
Figure 39:
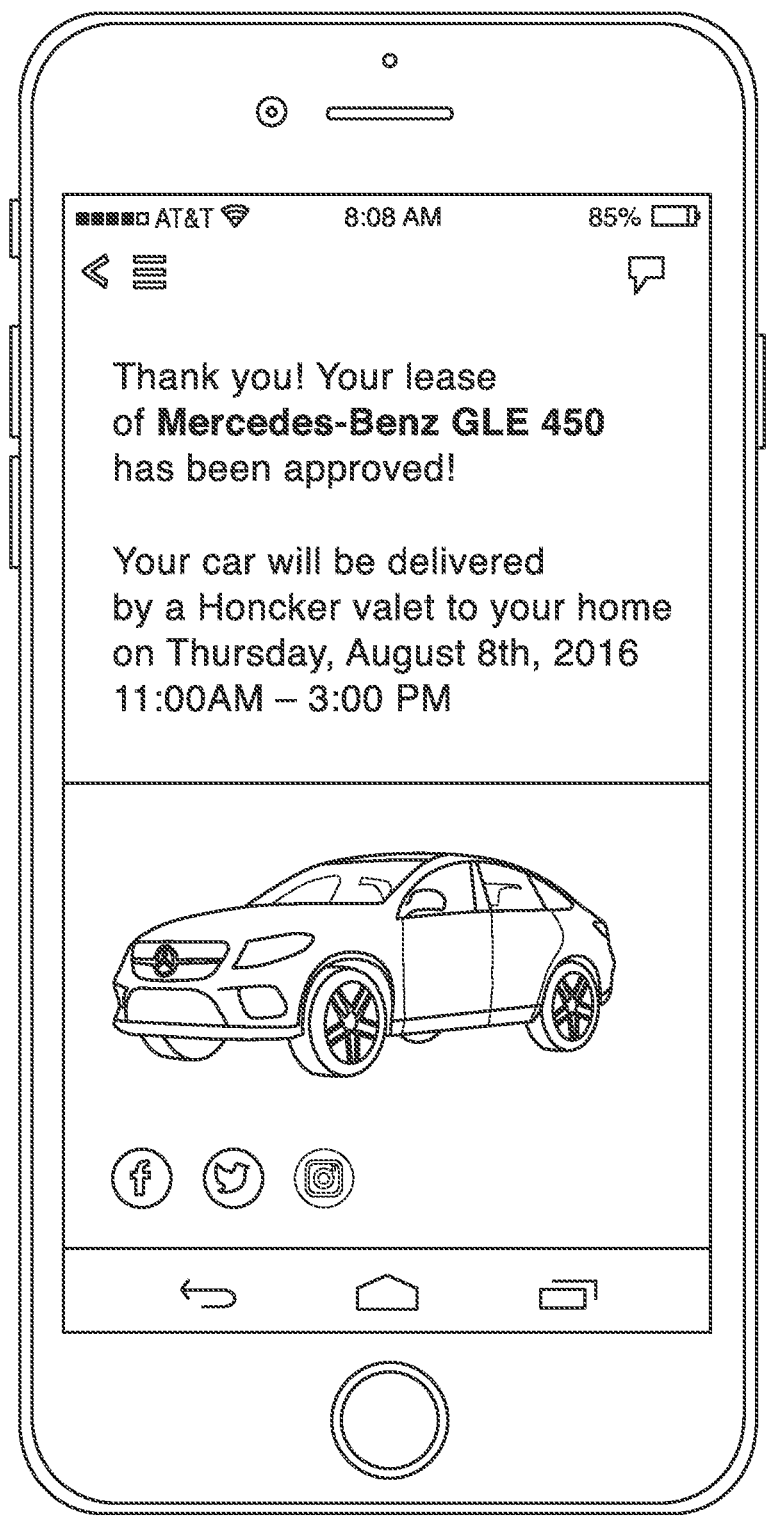
FIG. 39 illustrates an exemplary graphical user interface confirming a lease and delivery date and time.

In accordance with one or more preferred implementations, once a user has provided all necessary additional information or documents for a lease (e.g. satisfied all other action items), a lease graphical user interface will be updated to indicate that the only outstanding action item is to specify a pick up or delivery date (and preferably time) for the leased vehicle. FIG. 38 illustrates an exemplary graphical user interface indicating that a user needs to specify a delivery date for a leased vehicle, and FIG. 39 illustrates an exemplary graphical user interface confirming a lease and delivery date and time. In accordance with one or more preferred implementations, such an interface includes one or more user interface elements which allow a user to easily share information regarding his new vehicle via one or more social media sites or networks.

In accordance with one or more preferred implementations, a leasing platform is configured to display special offers and indicate to a user via one or more graphical user interfaces a period for which the offer will remain valid, or an indication when the offer will expire.

In accordance with one or more preferred implementations, a dealer working with a vehicle leasing platform provider uploads inventory and pricing data to the leasing platform provider, contacts a lessee to set a delivery date and time, concierge-delivers leased vehicles (e.g. to any lessee within twenty five miles of a showroom), executes all paperwork upon vehicle delivery, and provides the exact vehicle that a lessee has leased at the quoted price.

In accordance with one or more preferred implementations, a vehicle leasing platform is compatible with all major customer relationship management (CRM) solutions, websites, and inventory management feeds. In accordance with one or more preferred implementations, an inventory manager of a dealership uploads data (e.g. via file transfer protocol (FTP)) to a server of the vehicle leasing platform, or provides the vehicle leasing platform with an application programming interface (API) feed.

In accordance with one or more preferred implementations, completed leases are pushed to a dealership's CRM system with all the data needed to fulfill the leases.

In accordance with one or more preferred implementations, all available manufacturer and consumer rebates are automatically applied by a vehicle leasing platform.

In accordance with one or more preferred implementations, such process even provides a guarantee that the potential lessee is receiving the lowest possible price for a lease.

In accordance with one or more preferred implementations, the use of a phone app allows a user's phone, phone number, and/or user information accessible via the phone to be utilized to authenticate the user. In accordance with one or more preferred implementations, this provides increased authentication as compared to use of a website or web app.

However, although described and illustrated herein largely in the context of a phone app, in accordance with one or more preferred implementations, systems, methods, and functionality are provided utilizing a web app, desktop application, website or web page, or other computer-implemented software or hardware.

In accordance with one or more preferred implementations, a leasing platform comprises one or more servers. In accordance with one or more preferred implementations, a leasing platform comprises a cloud platform.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method for vehicle leasing utilizing a plurality of graphical user interfaces (GUIs) of a phone app, the method comprising:
   (a) repeatedly receiving, at a leasing platform, vehicle specification and pricing data from one or more dealer management systems;
   (b) maintaining, at the leasing platform, vehicle specification and pricing data based on vehicle specification and pricing data received from the one or more dealer management systems;
   (c) repeatedly receiving, at the leasing platform, inventory data from one or more inventory management systems;
   (d) maintaining, at the leasing platform, inventory data based on received inventory data from the one or more inventory management systems;
   (e) providing, to a plurality of dealers, a dealer dashboard application configured to allow each dealer to allocate inventory to the leasing platform;
   (f) receiving, at the leasing platform, allocated inventory information input via the dealer dashboard application;
   (g) maintaining, at the leasing platform, allocated inventory information based on received allocated inventory information that was input via the dealer dashboard application;
   (h) providing, via an app store, the phone app;
   (i) displaying, to a user via a display of a phone of the user, a registration GUI of the phone app prompting a user to input biographical information;
   (j) receiving, from the user via the phone, input biographical information for the user;
   (k) automatically performing, by the leasing platform, a soft credit pull for the user to obtain credit information for the user;
   (l) displaying, to the user via the display of the phone of the user, a search GUI of the phone app prompting a user to input search criteria to search for a vehicle to lease;
   (m) receiving, from the user via the phone, input search criteria;
   (n) determining, by the leasing platform based on location information for the user and territory information for the plurality of dealers, a set of one or more dealers available for the user;
   (o) determining, by the leasing platform based at least in part on the maintained allocated inventory information, a set of vehicles available from the set of one or more dealers that match the input search criteria;
   (p) determining, by the leasing platform for each vehicle of the set of vehicles, utilizing the credit information for the user, customized lease pricing information for the first user for each vehicle of the set of vehicles, wherein such determining comprises utilizing a credit score, vehicle manufacturer rebate rates, and user information to create a user credit profile that is used in determining customized lease pricing information;
   (q) displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user;
   (r) receiving, via the phone, user input corresponding to an indication to request a lease for a selected vehicle;
   (s) based on the received user input corresponding to an indication to request a lease for the selected vehicle, communicating, from the phone to the leasing platform, an indication of the requested lease;
   (t) displaying, to a dealer via the dealer dashboard application, an indication of the requested lease;
   (u) receiving, from the dealer via the dealer dashboard application, approval of the requested lease; and
   (v) based on the requested lease, effecting delivery of the selected vehicle to the user.

2. The method of claim 1, wherein past lease information for a user is utilized in creating a user credit profile that is used in determining customized lease pricing information.

3. A computer-implemented method for vehicle leasing utilizing a plurality of graphical user interfaces (GUIs) of a phone app, the method comprising:
   (a) repeatedly receiving, at a leasing platform, vehicle specification and pricing data from one or more dealer management systems;
   (b) maintaining, at the leasing platform, vehicle specification and pricing data based on vehicle specification and pricing data received from the one or more dealer management systems;
   (c) repeatedly receiving, at the leasing platform, inventory data from one or more inventory management systems;
   (d) maintaining, at the leasing platform, inventory data based on received inventory data from the one or more inventory management systems;
   (e) providing, to a plurality of dealers, a dealer dashboard application configured to allow each dealer to allocate inventory to the leasing platform;
   (f) determining, at the leasing platform utilizing statistical analysis based on received inventory data from the one or more inventory management systems, that data for a first vehicle is statistically odd, and based thereon flagging the first vehicle for review via the dealer dashboard application;
   (g) receiving, at the leasing platform, allocated inventory information input via the dealer dashboard application;
   (h) maintaining, at the leasing platform, allocated inventory information based on received allocated inventory information that was input via the dealer dashboard application;
   (i) providing, via an app store, the phone app;
   (j) displaying, to a user via a display of a phone of the user, a registration GUI of the phone app prompting a user to input biographical information;
   (k) receiving, from the user via the phone, input biographical information for the user;
   (l) automatically performing, by the leasing platform, a soft credit pull for the user to obtain credit information for the user;
   (m) displaying, to the user via the display of the phone of the user, a search GUI of the phone app prompting a user to input search criteria to search for a vehicle to lease;
   (n) receiving, from the user via the phone, input search criteria;
   (o) determining, by the leasing platform based on location information for the user and territory information for the plurality of dealers, a set of one or more dealers available for the user;

- (p) determining, by the leasing platform based at least in part on the maintained allocated inventory information, a set of vehicles available from the set of one or more dealers that match the input search criteria;
- (q) determining, by the leasing platform for each vehicle of the set of vehicles, utilizing the credit information for the user, customized lease pricing information for the first user for each vehicle of the set of vehicles;
- (r) displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user;
- (s) receiving, via the phone, user input corresponding to an indication to request a lease for a selected vehicle;
- (t) based on the received user input corresponding to an indication to request a lease for the selected vehicle, communicating, from the phone to the leasing platform, an indication of the requested lease;
- (u) displaying, to a dealer via the dealer dashboard application, an indication of the requested lease;
- (v) receiving, from the dealer via the dealer dashboard application, approval of the requested lease; and
- (w) based on the requested lease, effecting delivery of the selected vehicle to the user.

4. The method of claim 3, wherein the method further comprises displaying, to a dealer via the dealer dashboard application, an indication that the first vehicle was found to be statistically odd, and receiving, from that dealer via the dealer dashboard application, user input corresponding to an indication to put the first vehicle back in inventory.

5. The method of claim 3, wherein the method further comprises displaying, to a dealer via the dealer dashboard application, an indication that the first vehicle was found to be statistically odd, and receiving, from that dealer via the dealer dashboard application, user input corresponding to an indication to discard the first vehicle.

6. A computer-implemented method for vehicle leasing utilizing a plurality of graphical user interfaces (GUIs) of a phone app, the method comprising:
- (a) repeatedly receiving, at a leasing platform, vehicle specification and pricing data from one or more dealer management systems;
- (b) maintaining, at the leasing platform, vehicle specification and pricing data based on vehicle specification and pricing data received from the one or more dealer management systems;
- (c) repeatedly receiving, at the leasing platform, inventory data from one or more inventory management systems;
- (d) maintaining, at the leasing platform, inventory data based on received inventory data from the one or more inventory management systems;
- (e) providing, to a plurality of dealers, a dealer dashboard application configured to allow each dealer to allocate inventory to the leasing platform;
- (f) determining, at the leasing platform utilizing statistical analysis based on received inventory data from the one or more inventory management systems, that data for a first vehicle is statistically odd, and based thereon removing the first vehicle from available inventory and flagging the first vehicle for review via the dealer dashboard application;
- (g) receiving, at the leasing platform, allocated inventory information input via the dealer dashboard application;
- (h) maintaining, at the leasing platform, allocated inventory information based on received allocated inventory information that was input via the dealer dashboard application;
- (i) providing, via an app store, the phone app;
- (j) displaying, to a user via a display of a phone of the user, a registration GUI of the phone app prompting a user to input biographical information;
- (k) receiving, from the user via the phone, input biographical information for the user;
- (l) automatically performing, by the leasing platform, a soft credit pull for the user to obtain credit information for the user;
- (m) displaying, to the user via the display of the phone of the user, a search GUI of the phone app prompting a user to input search criteria to search for a vehicle to lease;
- (n) receiving, from the user via the phone, input search criteria;
- (o) determining, by the leasing platform based on location information for the user and territory information for the plurality of dealers, a set of one or more dealers available for the user;
- (p) determining, by the leasing platform based at least in part on the maintained allocated inventory information, a set of vehicles available from the set of one or more dealers that match the input search criteria;
- (q) determining, by the leasing platform for each vehicle of the set of vehicles, utilizing the credit information for the user, customized lease pricing information for the first user for each vehicle of the set of vehicles;
- (r) displaying, to the user via the display of the phone of the user, a vehicle browsing GUI including a listing for one or more vehicles of the set of vehicles, each listing for a respective vehicle including an indication of a customized monthly payment amount for a lease of the respective vehicle that is available to the user, the customized monthly payment amount for the respective vehicle being based on the determined customized leasing pricing information for the first user;
- (s) receiving, via the phone, user input corresponding to an indication to request a lease for a selected vehicle;
- (t) based on the received user input corresponding to an indication to request a lease for the selected vehicle, communicating, from the phone to the leasing platform, an indication of the requested lease;
- (u) displaying, to a dealer via the dealer dashboard application, an indication of the requested lease;
- (v) receiving, from the dealer via the dealer dashboard application, approval of the requested lease; and
- (w) based on the requested lease, effecting delivery of the selected vehicle to the user.

7. The method of claim 6, wherein the method further comprises displaying, to a dealer via the dealer dashboard application, an indication that the first vehicle was found to be statistically odd, and receiving, from that dealer via the dealer dashboard application, user input corresponding to an indication to put the first vehicle back in inventory.

8. The method of claim 6, wherein the method further comprises displaying, to a dealer via the dealer dashboard application, an indication that the first vehicle was found to be statistically odd, and receiving, from that dealer via the dealer dashboard application, user input corresponding to an indication to discard the first vehicle.

\* \* \* \* \*